US012650351B2

(12) United States Patent
Ueda et al.

(10) Patent No.: US 12,650,351 B2
(45) Date of Patent: Jun. 9, 2026

(54) OPTICAL FIBER-EMBEDDED PC STEEL STRAND, STRAIN MEASUREMENT DEVICE, AND PRODUCTION METHOD FOR OPTICAL FIBER-EMBEDDED PC STEEL STRAND

(71) Applicant: SUMITOMO ELECTRIC INDUSTRIES, LTD., Osaka (JP)

(72) Inventors: Noboru Ueda, Osaka (JP); Youji Nakai, Osaka (JP); Katsuhito Oshima, Osaka (JP); Yoshiyuki Matsubara, Osaka (JP); Motonobu Nishino, Osaka (JP); Masashi Oikawa, Osaka (JP); Shinji Nakaue, Osaka (JP); Naoki Sogabe, Tokyo (JP); Michio Imai, Tokyo (JP); Toru Yamamoto, Tokyo (JP); Shinichi Yamanobe, Tokyo (JP); Kazumasa Okubo, Tokyo (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 259 days.

(21) Appl. No.: 18/570,786

(22) PCT Filed: May 11, 2022

(86) PCT No.: PCT/JP2022/019989
§ 371 (c)(1),
(2) Date: Dec. 15, 2023

(87) PCT Pub. No.: WO2023/021797
PCT Pub. Date: Feb. 23, 2023

(65) Prior Publication Data
US 2024/0280423 A1    Aug. 22, 2024

(30) Foreign Application Priority Data

Aug. 20, 2021    (JP) ................................. 2021-134853

(51) Int. Cl.
*G01L 1/24*    (2006.01)

(52) U.S. Cl.
CPC .................................... *G01L 1/242* (2013.01)

(58) Field of Classification Search
CPC . G01L 1/242; G01B 11/18; D07B 2201/2096; D07B 2501/2023;
(Continued)

(56) References Cited

U.S. PATENT DOCUMENTS

2018/0274237 A1* 9/2018 Oikawa .................. D07B 1/145
2021/0116265 A1* 4/2021 Tadakuma ............. H01B 11/22

FOREIGN PATENT DOCUMENTS

JP    2000-046527    2/2000
JP    2000-329984    11/2000
(Continued)

OTHER PUBLICATIONS

JP2019070593_english translation.*

*Primary Examiner* — Xin Y Zhong
(74) *Attorney, Agent, or Firm* — IPUSA, PLLC

(57) ABSTRACT

An optical fiber-embedded PC steel strand includes a PC steel strand in which a plurality of PC steel wires are twisted together, and an optical fiber. The optical fiber is fixed with a resin in a twist groove that is a groove between two PC steel wires of the PC steel wires, the two PC steel wires being disposed at an outer surface of the PC steel strand and being next to each other. A coefficient of variation in distance between a common tangent of the two PC steel wires that form the twist groove and are next to each other, and a center of the optical fiber is 0.5 or less, as measured in 10 cross sections of the PC steel strand that are perpendicular to a longitudinal direction of the PC steel strand.

8 Claims, 6 Drawing Sheets

(58) Field of Classification Search
CPC ......... D07B 1/0693; D07B 1/145; E04C 5/08;
E04G 21/12; G02B 6/44
See application file for complete search history.

(56) References Cited

FOREIGN PATENT DOCUMENTS

| | | | |
|----|-------------------|---|--------|
| JP | 2016-057231 | | 4/2016 |
| JP | 2018-028443 | | 2/2018 |
| JP | 2019-070593 | | 5/2019 |
| JP | 2019070593 A | * | 5/2019 |
| WO | 2016/111290 | | 7/2016 |
| WO | 2020/027223 | | 2/2020 |

* cited by examiner

OPTICAL FIBER-EMBEDDED PC STEEL STRAND, STRAIN MEASUREMENT DEVICE, AND PRODUCTION METHOD FOR OPTICAL FIBER-EMBEDDED PC STEEL STRAND

TECHNICAL FIELD

The present disclosure relates to optical fiber-embedded PC steel strands, strain measurement devices, and production methods for optical fiber-embedded PC steel strands.

The present application claims priority to Japanese Patent Application No. 2021-134853, filed on Aug. 20, 2021, and the contents of the above Japanese patent application are incorporated herein by reference in their entirety.

BACKGROUND ART

Patent Literature 1 discloses a PC steel strand including: a PC steel wire group including a plurality of PC steel wires that are twisted together; and an optical fiber member, the optical fiber member including: an optical fiber including an optical fiber core and a coating on the optical fiber core; and a resin filler enclosing the optical fiber, in which the optical fiber member is disposed so as to extend between and along the PC steel wires next to each other, and in a cross section orthogonal to a longitudinal direction of the PC steel wire group, the optical fiber member is housed in a region enclosed by the respective surfaces of the PC steel wires next to each other and a common tangent of the PC steel wires next to each other.

CITATION LIST

Patent Literature

Patent Literature 1: Japanese Laid-Open Patent Publication No. 2016-57231

SUMMARY OF INVENTION

An optical fiber-embedded PC steel strand of the present disclosure includes: a PC steel strand in which a plurality of PC steel wires are twisted together; and an optical fiber. The optical fiber is fixed with a resin in a twist groove that is a groove between two PC steel wires of the PC steel wires, the two PC steel wires being disposed at an outer surface of the PC steel strand and being next to each other. A coefficient of variation in distance between: a common tangent of the two PC steel wires that form the twist groove and are next to each other; and a center of the optical fiber is 0.5 or less, as measured in 10 cross sections of the PC steel strand that are perpendicular to a longitudinal direction of the PC steel strand.

BRIEF DESCRIPTION OF DRAWINGS

FIG. 1 is a perspective view of an optical fiber-embedded PC steel strand according to one embodiment of the present disclosure.

DESCRIPTION OF EMBODIMENTS

Figure 2:
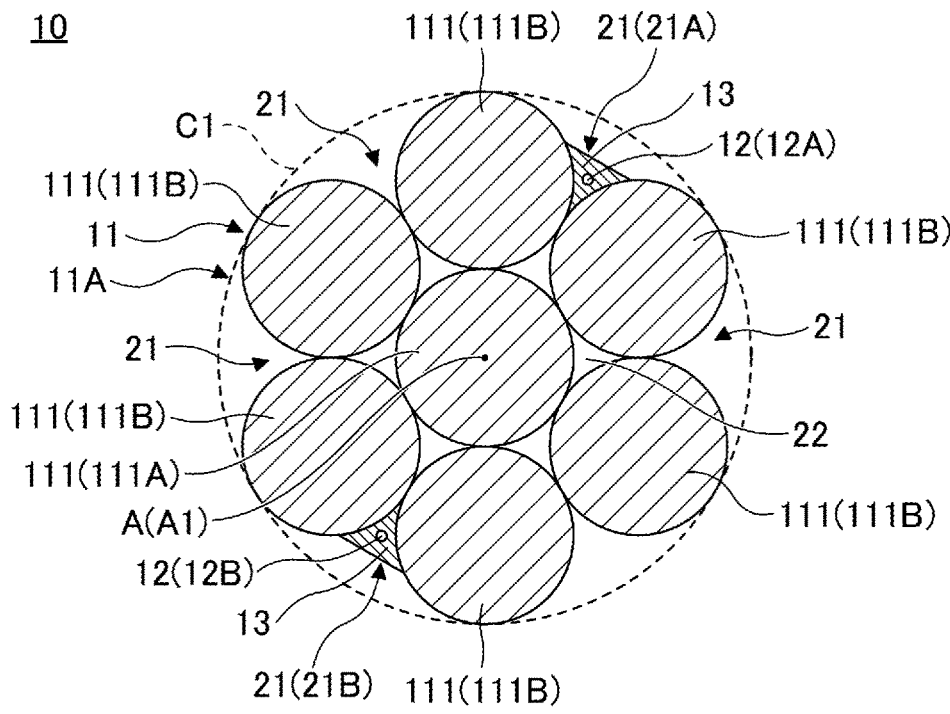
FIG. 2 is a cross-sectional view of the optical fiber-embedded PC steel strand of FIG. 1 in a plane perpendicular to a longitudinal direction thereof.

Objects to be Solved by the Present Disclosure

Concrete structures have such a property that is prone to a tensile force. In view thereof, in order to previously apply a compressive force to such concrete structures, control a tensile stress occurring when the concrete structures receive a load, and prevent formation of cracks and the like, a tendon such as a PC steel strand or the like is used.

Also, using, as the tendon, the optical fiber-including PC steel strand disclosed in Patent Literature 1 or the like, measurement of a strain distribution of the PC steel strand along the longitudinal direction of the PC steel strand, evaluation of a tension introduced to the PC steel strand, and the like are performed by the optical fiber and based on the scattering light.

When a strain distribution is measured using an optical fiber after introduction of a uniform tension by pulling the ends of an existing optical fiber-embedded PC steel strand, the measured value may be found to be different in accordance with positions along the longitudinal direction of the optical fiber-embedded PC steel strand.

The optical fiber-embedded PC steel strand may be required to further improve in measurement accuracy of strain depending on, for example, a place where it is installed. Therefore, there has been a need for an optical fiber-embedded PC strand that has suppressed occurrence of the difference in the measured value in accordance with positions along the longitudinal direction of the optical fiber-embedded PC steel strand, and enables accurate measurement of strain.

It is an object of the present disclosure to provide an optical fiber-embedded PC steel strand that enables accurate measurement of strain.

Effects of the Present Disclosure

According to the present disclosure, it is possible to provide an optical fiber-embedded PC steel strand that enables accurate measurement of strain.

Description of Embodiments of the Present Disclosure

First, embodiments of the present disclosure will be listed and described. In the following description, the same or corresponding elements are provided with the same symbols, and the same description thereof is not repeated.

(1) An optical fiber-embedded PC steel strand according to one aspect of the present disclosure includes:

a PC steel strand in which a plurality of PC steel wires are twisted together; and an optical fiber, in which the optical fiber is fixed with a resin in a twist groove that is a groove between two PC steel wires of the PC steel wires, the two PC steel wires being disposed at an outer surface of the PC steel strand and being next to each other, and a coefficient of variation in distance between: a common tangent of the two PC steel wires that form the twist groove and are next to each other; and a center of the optical fiber is 0.5 or less, as measured in 10 cross sections of the PC steel strand that are perpendicular to a longitudinal direction of the PC steel strand.

The fact that the above-described coefficient of variation of the optical fiber-embedded PC steel strand according to one aspect of the present disclosure is 0.5 or less means suppressed variation in distance between the common tangent of the two PC steel wires, which form the twist groove and are next to each other, and the center of the optical fiber in the 10 measured cross sections. That is, this means suppressed variation in position of the optical fiber in the cross sections of the PC steel strand perpendicular to the longitudinal direction of the PC steel strand. Therefore, when a tension is uniformly introduced to the optical fiber-embedded PC steel strand and the resulting optical fiber-embedded PC steel strand is measured for a strain distribution along the longitudinal direction thereof, it is possible to suppress occurrence of the difference in the measured value of strain in accordance with the positions along the longitudinal direction thereof, i.e., a range of variation. Therefore, use of the optical fiber-embedded PC steel strand enables accurate measurement of strain.

Note that, the coefficient of variation is a parameter indicating a degree of variation in measured values. The coefficient of variation is a value calculated by dividing a standard deviation of the measured values by an average value of the measured values, and is a dimensionless number.

(2) In the cross section of the PC steel strand perpendicular to the longitudinal direction of the PC steel strand, the optical fiber may be positioned in a region enclosed by: a straight line that is parallel to the common tangent and 0.1 mm apart from the common tangent inward of the PC steel strand; and surfaces of the two PC steel wires that form the twist groove and are next to each other.

By disposing the optical fiber in the above-described region, the optical fiber can be disposed in proximity to the PC steel strand and the strain of the PC steel strand can be measured with higher accuracy.

(3) In the cross section of the PC steel strand perpendicular to the longitudinal direction of the PC steel strand, an outer surface of the optical fiber may be coated with the resin.

By coating the outer surface of the optical fiber with the resin, the optical fiber can be firmly fixed to the PC steel strand and can especially accurately conform to stretching of the PC steel strand. Therefore, the strain occurring in the PC steel strand is especially accurately reflected to the optical fiber, and the strain of the PC steel strand can be measured using the optical fiber with especially high accuracy. Also, coating the outer surface of the optical fiber with the resin can protect the optical fiber and prevent damage to the optical fiber.

(4) The optical fiber may be two or more.

When the optical fiber-embedded PC steel strand includes two or more optical fibers, even if one of the optical fibers is damaged, for example, during construction, due to aging, or the like, the strain measurement and the like can be performed using another optical fiber.

Although the strain and the temperature of the PC steel strand can be measured based on the scattering light using the optical fiber, the two or more optical fibers may be required, for example, when the strain and the temperature are measured at the same time, or in accordance with measurement systems of the strain and the temperature. Therefore, in order to adapt to various measurement systems, the optical fiber-embedded PC steel strand preferably includes two or more optical fibers.

(5) An elongation at break of the resin may be 3.5% or more.

According to JIS G 3536 (2014), an elongation at break of the PC steel strand is 3.5% or more. Therefore, the resin having an elongation at break of 3.5% or more can deform in accordance with deformation of the PC steel strand even if a force for the PC steel strand or the resin to break is applied to the optical fiber-embedded PC steel strand. Accordingly, when the elongation at break of the resin is 3.5% or more, the resin readily deforms in accordance with the PC steel strand of the optical fiber-embedded PC steel strand to which the tension has been introduced, and durability of the optical fiber-embedded PC steel strand can be improved.

(6) An anticorrosive coating that coats the outer surface of the PC steel strand may be included.

When the optical fiber-embedded PC steel strand includes the anticorrosive coating, it is possible to protect the PC steel strand from an external environment and to suppress corrosion of the PC steel strand.

(7) A strain measurement device according to one aspect of the present disclosure includes:

the optical fiber-embedded PC steel strand according to any one of (1) to (6); and a scattering light measurement device connected to the optical fiber-embedded PC steel strand.

According to the strain measurement device according to one aspect of the present disclosure, which uses the optical fiber-embedded PC steel strand according to one aspect of the present disclosure, it is possible to suppress the range of variation in the measured value of strain in accordance with positions along the longitudinal direction of the optical fiber-embedded PC steel strand, and to measure the strain and the like with high accuracy.

According to the strain measurement device according to one aspect of the present disclosure, the measurements of the strain and the temperature can be performed using the optical fiber-embedded PC steel strand. Therefore, the strain and the temperature can be readily measured even if the measurements thereof are hard to perform from the exterior, e.g., when the optical fiber-embedded PC steel strand is, for example, embedded. Also, for example, compared to the case of measuring the temperature using a thermometer other than the optical fiber-embedded PC steel strand, it is possible to correct the strain with the temperature with high accuracy because a measurement point of the strain and a measurement point of the temperature are in proximity to each other.

Moreover, according to the strain measurement device according to one aspect of the present disclosure, the strain and the temperature are measured using the scattering light. Thus, the degree of burden in performing an on-site measurement is small, and it is possible to readily perform the measurement.

(8) The scattering light measurement device may include an interface configured to output measurement data.

The scattering light measurement device including the interface can output, to the exterior, data of the measured strain and temperature and data of the corrected strain. For example, the scattering light measurement device may be configured to output the data, such as the strain, to an external information terminal from the interface via a network or the like. With this configuration, it is possible to readily obtain data such as the strain of a concrete structure in a remote place.

(9) A production method for the optical fiber-embedded PC steel strand according to one aspect of the present disclosure includes:

a disposing step of disposing an optical fiber in a twist groove that is a groove between two PC steel wires of a plurality of PC steel wires twisted together to form a PC steel strand, the two PC steel wires being disposed at an outer surface of the PC steel strand and being next to each other; and a fixing step of fixing the optical fiber in the twist groove with a resin, in which in the disposing step, a tension of more than 0 N and 20 N or less is applied to the optical fiber.

By applying the tension of more than 0 N to the optical fiber, positioning of the optical fiber to be fed can be readily performed, and the optical fiber can be set at a desired position in the twist groove of a PC steel strand. Therefore, in a plurality of cross sections of the optical fiber-embedded PC steel strand that are perpendicular to the longitudinal direction of the optical fiber-embedded PC steel strand 40, it is possible to suppress variation in position of the optical fiber disposed in the twist groove. Accordingly, when a strain distribution of the obtained optical fiber-embedded PC steel strand is measured along the longitudinal direction thereof after a tension has been uniformly introduced thereto, it is possible to suppress the range of variation in the measured value of strain in accordance with positions along the longitudinal direction thereof. That is, use of the thus-produced optical fiber-embedded PC steel strand enables accurate measurement of strain.

When the tension to be applied to the optical fiber is 20 N or less, it is possible to prevent damage to the optical fiber.

(10) After the disposing step and before performing the fixing step, a resin-supplying step of supplying the resin to the twist groove may be included.

By supplying the resin to the twist groove after the disposing step and before performing the fixing step, it is possible to supply the resin over a wide range of the outer surface of the optical fiber. Therefore, the optical fiber can be firmly fixed to the PC steel strand and can especially accurately conform to stretching of the PC steel strand. As a result, the strain occurring in the PC steel strand is especially accurately reflected to the optical fiber, and the strain of the PC steel strand can be measured using the optical fiber with especially high accuracy.

(11) A curing time of the resin may be one minute or shorter.

Use of the resin having a curing time of one minute or shorter can shorten the time required until the fixing with the resin after the optical fiber has been disposed at a desired position in the twist groove. Therefore, it is possible to prevent displacement of the position of the optical fiber which would otherwise occur before the resin is cured. As a result, in the plurality of cross sections of the optical fiber-embedded PC steel strand that are perpendicular to the longitudinal direction of the optical fiber-embedded PC steel strand, it is possible to set the optical fiber at a desired position in the twist groove with high accuracy, e.g., it is possible to set the optical fiber with high accuracy at a position in the twist groove at which the optical fiber is initially disposed. Accordingly, when a strain distribution of the obtained optical fiber-embedded PC steel strand is measured along the longitudinal direction thereof after a tension has been uniformly introduced thereto, it is possible to especially suppress the range of variation in the measured value of strain in accordance with positions along the longitudinal direction thereof. That is, it is possible to measure the strain with especially high accuracy.

(12) The resin is a UV-curable resin, and in the fixing step, the resin may be irradiated with ultraviolet rays.

The UV-curable resin is a resin that is curable only by irradiation with ultraviolet rays. Thus, compared to the case of performing heating or the like, it is possible to suppress impacts to members other than the resin, such as the optical fiber. Also, compared to a thermosetting resin, a two-liquid mixing-type resin, or the like, the UV-curable resin often has a short curing time. Thus, it is possible to especially prevent displacement of the position of the optical fiber in the twist groove which would otherwise occur before the resin is cured.

Details of Embodiments of the Present Disclosure

Specific examples of the optical fiber-embedded PC steel strand, the strain measurement device, or the production method for the optical fiber-embedded PC steel strand according to one embodiment of the present disclosure (hereinafter referred to as "the present embodiment") will be described below with reference to the drawings. Note that, the present invention is not limited to these examples, but is intended to encompass all changes within the meaning and scope that are recited in the claims and are equivalent to the claims.

1. Optical Fiber-Embedded PC Steel Strand

Figure 1:
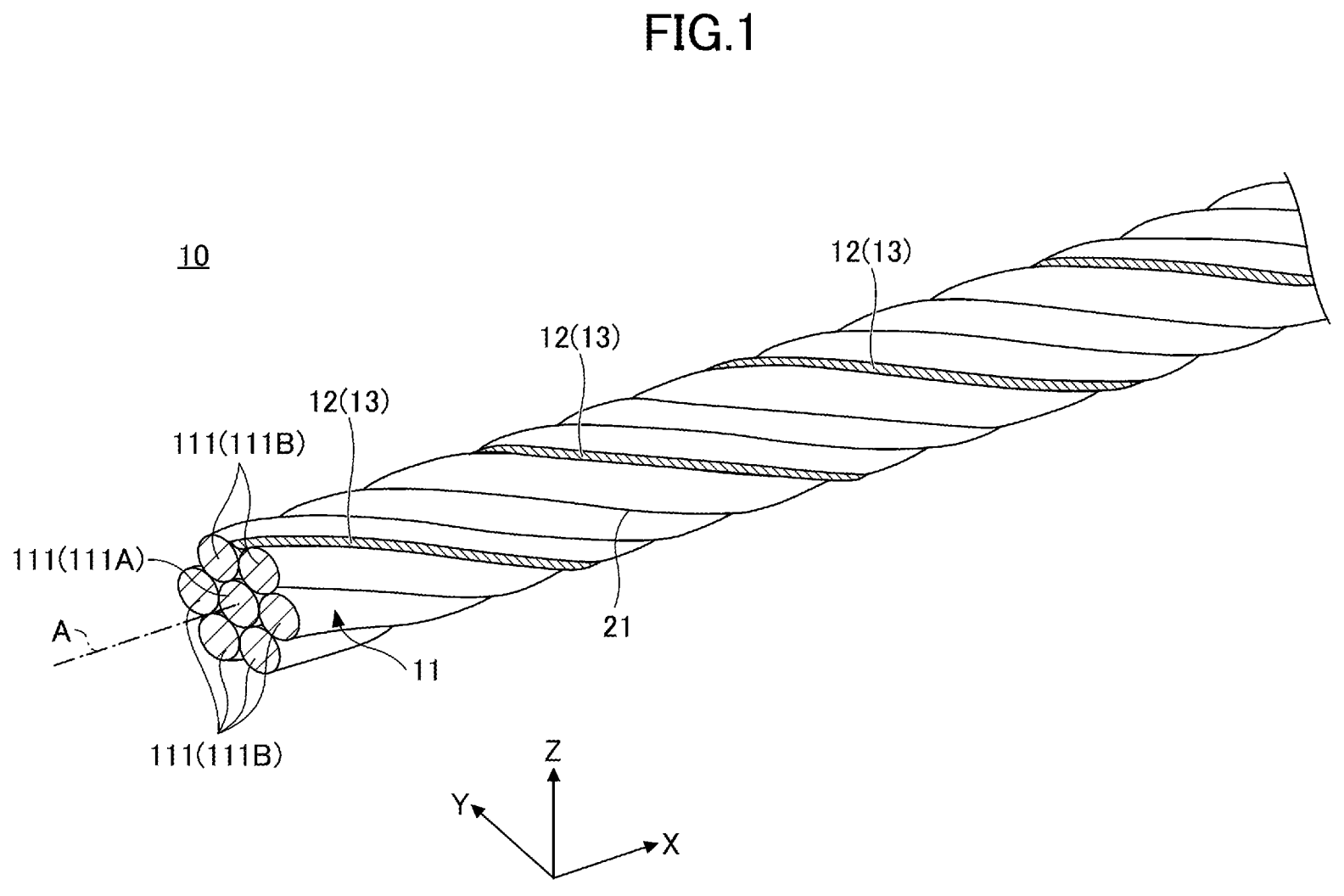

A configuration example of the optical fiber-embedded PC steel strand of the present embodiment will be described with reference to FIG. 1 to FIG. 4.

Figure 3:
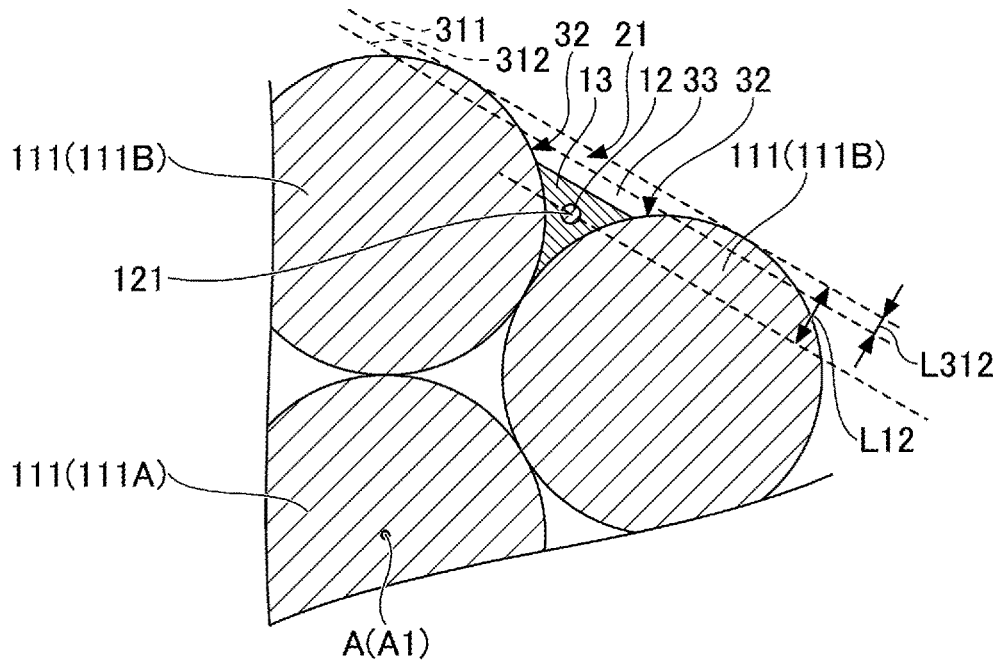
FIG. 3 is an enlarged view of a vicinity of the optical fiber of FIG. 2.
Figure 4:
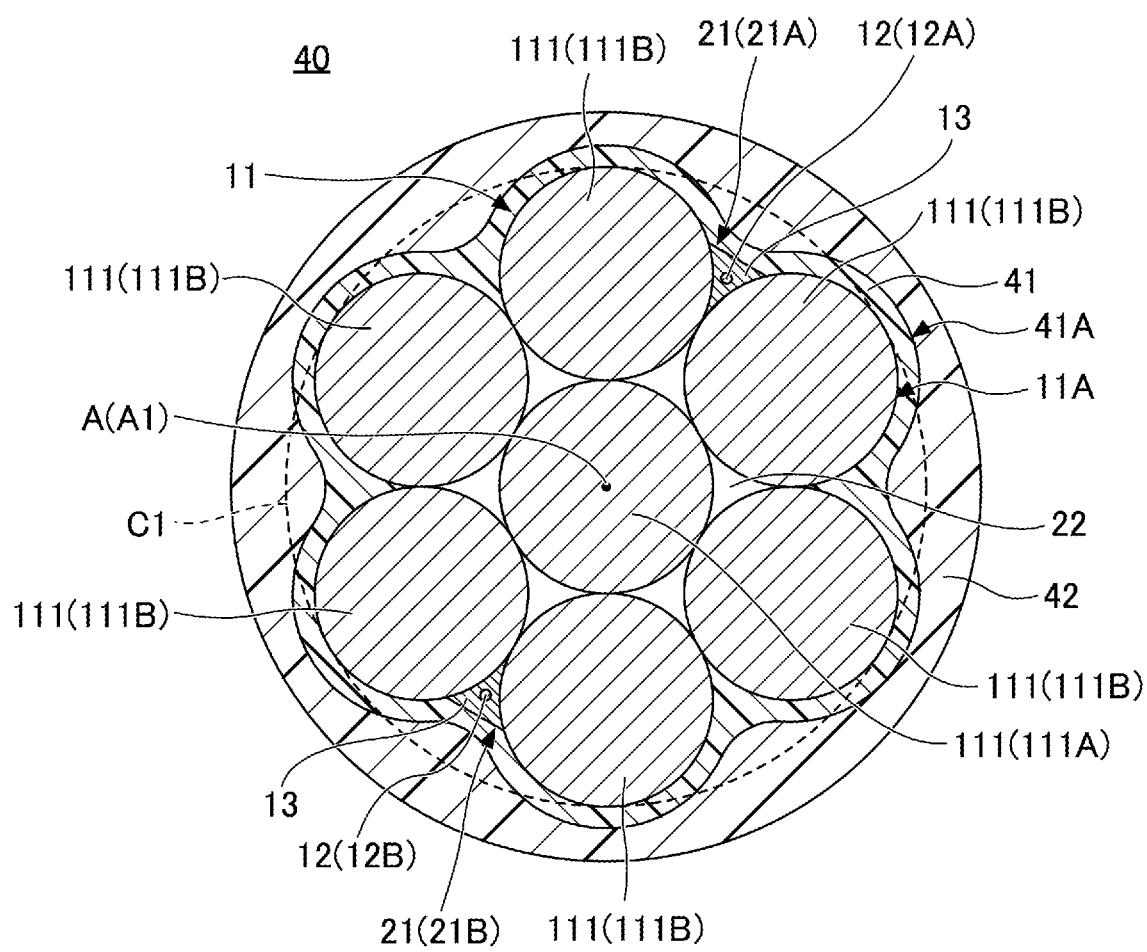
FIG. 4 is a cross-sectional view of an optical fiber-embedded PC steel strand including an anticorrosive coating, the cross-sectional view being in a plane perpendicular to a longitudinal direction thereof.

FIG. 1 is a perspective view of the optical fiber-embedded PC steel strand of the present embodiment. FIG. 2 illustrates a configuration example of a cross section of an optical fiber-embedded PC steel strand 10 and the PC steel strand 11 as illustrated in FIG. 1, the cross section being perpendicular to the longitudinal direction thereof. FIG. 3 is a partially enlarged view of FIG. 2. FIG. 4 is an explanatory view of a cross section of an optical fiber-embedded PC steel strand including an anticorrosive coating, the cross section being perpendicular to the longitudinal direction thereof.

The optical fiber-embedded PC steel strand of the present embodiment may include the PC steel strand in which the plurality of PC steel wires are twisted together, and the optical fiber. The optical fiber is fixed with the resin in the twist groove that is the groove between the two PC steel wires that are disposed at the outer surface of the PC steel strand and are next to each other.

Note that, the PC in the PC steel strand or the PC steel wires means prestressed concrete.

First, the PC steel strand, the optical fiber, and the resin, which are members included in the optical fiber-embedded PC steel strand of the present embodiment, will be described.

(1) Regarding the Members Included in the Optical Fiber-Embedded PC Steel Strand (1-1) PC Steel Strand The optical fiber-embedded PC steel strand 10 as illustrated in FIG. 1 includes the PC steel strand 11 in which a plurality of PC steel wires 111, which are wires made of steel, are twisted together. Each of the PC steel wires 111 bears a tension after the tension has been introduced to the optical fiber-embedded PC steel strand 10.

An X axis in FIG. 1 is an axis along the longitudinal direction of the optical fiber-embedded PC steel strand 10 and the PC steel strand 11. Also, a YZ plane formed by a Y axis and a Z axis that are orthogonal to the X axis is a cross section perpendicular to the longitudinal direction of the optical fiber-embedded PC steel strand 10 and the PC steel strand 11.

No particular limitation is imposed on the number of the PC steel wires 111 forming the PC steel strand 11. The number of the PC steel wires 111 forming the PC steel strand 11 can be selected in accordance with, for example, performance required for the optical fiber-embedded PC steel strand and a manner in which the optical fiber-embedded PC steel strand is used. The number of the PC steel wires 111 is, for example, seven or nineteen. When the number of the PC steel wires 111 is seven, the PC steel strand 11 can form a mono-layered twisted structure in which six PC steel wires 111B to serve as outer peripheral wires are helically twisted around the outer periphery of one PC steel wire 111A to serve as the center wire, as illustrated in FIG. 1 and FIG. 2. In this case, the PC steel wires 111B to serve as the outer peripheral wires are positioned at the outermost periphery of the PC steel strand 11. FIG. 1 and FIG. 2 illustrate an example in which PC steel wires having the same outer diameters are used as the PC steel wire 111A to serve as the center wire and the PC steel wires 111B to serve as the outer peripheral wires. However, such an embodiment is by no means a limitation. For example, the outer diameter of the PC steel wire 111A to serve as the center wire may be different from the outer diameter of the PC steel wires 111B to serve as the outer peripheral wires.

Meanwhile, when the number of PC steel wires is nineteen, the PC steel strand can form an unillustrated bi-layered twisted structure in which PC steel wires to serve as inner peripheral wires and PC steel wires to serve as outer peripheral wires are helically twisted in order around one PC steel wire to serve as the center wire. Typically, there are two types having different combinations of the number of inner peripheral wires and the number of outer peripheral wires.

Specifically, one of the types is a structure including one center wire, nine inner peripheral wires, and nine outer peripheral wires, and the other type is a structure including one center wire, six inner peripheral wires, and twelve outer peripheral wires. In the former type, the center wire and the outer peripheral wires can be PC steel wires having approximately the same outer diameters, and the inner peripheral wires can be PC steel wires having smaller outer diameters than the outer diameter of the center wire.

In the latter type, the center wire and the inner peripheral wires can be PC steel wires having approximately the same outer diameters. The outer peripheral wires can be an alternating arrangement of: PC steel wires having approximately the same outer diameters as the outer diameter of the center wire; and PC steel wires having outer diameters smaller than the PC steel wires having approximately the same outer diameters as the outer diameter of the center wire.

As illustrated in FIG. 2, the PC steel strand 11 has a recessed portion formed between two PC steel wires 111B that are disposed at an outer surface 11A of the PC steel strand 11 and are next to each other, i.e., a twist groove 21 that is a groove between the outer peripheral wires. Also, the PC steel strand 11 has an inner gap 22 that is a space enclosed by three PC steel wires 111 that are next to each other. The twist groove 21 and the inner gap 22 have a helical shape about a center axis A serving as the center so as to extend along the longitudinal direction of the PC steel strand 11.

When the PC steel strand 11 is the mono-layered twisted structure as illustrated in FIG. 1 and FIG. 2, i.e., the number of the PC steel wires included in the PC steel strand 11 is seven, the inner gap 22 is formed between the PC steel wire 111A to serve as the center wire and the PC steel wires 111B to serve as two outer peripheral wires.

When the PC steel strand is the bi-layered twisted structure, i.e., the number of the PC steel wires included in the PC steel strand is nineteen or the like, the inner gap is formed between the center wire and two inner peripheral wires, between one inner peripheral wire and two outer peripheral wires, and between two inner peripheral wires and one outer peripheral wire.

(1-2) Optical Fiber

The optical fiber-embedded PC steel strand can include the optical fiber as described above.

The optical fiber that is suitably usable includes a core and a cladding. Examples of the materials of the core and the cladding include plastics and quartz glass. The optical fiber can utilize an optical fiber wire including a primary coating on the outer periphery of the cladding, an optical fiber core wire further including a secondary coating, or an optical fiber code further including a reinforcing material on the outer periphery of the secondary coating and a sheath covering the outer periphery of the reinforcing material. Examples of the material of the primary coating include UV-curable resins. Examples of the secondary coating include flame-retardant polyester elastomers. Examples of the material of the reinforcing material include glass fibers, carbon fibers, aramid fibers, and the like. Examples of the material of the sheath include flame-retardant polyolefins such as flame-retardant polyethylene, flame-retardant crosslinked polyolefins such as flame-retardant crosslinked polyethylene, heat-resistant vinyl, and the like.

No particular limitation is imposed on the type of the optical fiber included in the optical fiber-embedded PC steel strand. The optical fiber included in the optical fiber-embedded PC steel strand is preferably, for example, one or more optical fibers selected from single-mode optical fibers, multi-mode optical fibers, and polarization maintaining optical fibers.

By using the optical fiber included in the optical fiber-embedded PC steel strand and utilizing scattering light, the strain and the temperature of the PC steel strand can be measured. When the strain and the temperature are measured, it is preferable to use Brillouin scattering light, Rayleigh scattering light, Raman scattering light, or the like as the scattering light. Therefore, it is possible to select a suitable optical fiber in accordance with scattering light to be used, measurement accuracy to be required, and the like.

The optical fiber-embedded PC steel strand of the present embodiment may include only one optical fiber, or two or more optical fibers. For example, by using the optical fiber of the optical fiber-embedded PC steel strand of the present embodiment, the strain and the temperature can be measured. Therefore, for example, the optical fiber-embedded PC steel strand of the present embodiment may include a strain measurement optical fiber and a temperature measurement optical fiber in accordance with measurement applications. As the strain measurement optical fiber and the temperature measurement optical fiber, it is possible to use an optical fiber of an appropriate type in accordance with, for example, measurement conditions such as scattering light used in the respective measurements and the like.

No particular limitation is imposed on the outer diameter of the optical fiber. In the optical fiber-embedded PC steel strand of the present embodiment, the optical fiber is disposed in the twist groove. Therefore, the outer diameter of the optical fiber is preferably selected so that the optical fiber can be housed in the twist groove. The outer diameter of the optical fiber is, for example, preferably 1.5 mm or less and more preferably 1.0 mm or less.

When the outer dimeter of the optical fiber is 1.5 mm or less, the optical fiber can be readily housed in the twist groove of the PC steel strand.

No particular limitation is imposed on the lower limit of the outer dimeter of the optical fiber. However, the outer dimeter of the optical fiber is preferably 0.235 mm or more and more preferably 0.8 mm or more. The optical fiber is also preferably excellent in durability because heat or an external force may be applied to the optical fiber during the production process of the optical fiber-embedded PC steel strand or upon setting the optical fiber-embedded PC steel strand in structures. The durability of the optical fiber can be increased when the outer dimeter of the optical fiber is 0.235 mm or more.

Note that, the outer dimeter of the optical fiber means the outer dimeter of the entire optical fiber including coatings such as the primary coating and the secondary coating as described above.

Also, an elongation at break of the optical fiber is preferably 3.5% or more.

Preferably, the optical fiber can conform to deformation of the PC steel strand. According to JIS G 3536 (2014), the elongation at break of the PC steel strand is 3.5% or more. Therefore, the optical fiber having an elongation at break of 3.5% or more can deform in accordance with deformation of the PC steel strand even if a force for the PC steel strand or the optical fiber to break is applied to the optical fiber-embedded PC steel strand. Accordingly, when the elongation at break of the optical fiber is 3.5% or more, the optical fiber readily deforms in accordance with the PC steel strand of the optical fiber-embedded PC steel strand to which the tension has been introduced, and durability of the optical fiber-embedded PC steel strand can be improved. Note that, in the present specification, the elongation at break of the optical fiber and the resin can be measured in accordance with JIS G 3536 (2014), which stipulates the same conditions as the conditions for the PC steel strand applied to the optical fiber-embedded PC steel strand.

Specifically, for example, after the production of the optical fiber-embedded PC steel strand, a tensile test can be performed to evaluate the elongation at break. When the tensile test is performed for the optical fiber-embedded PC steel strand and the elongation of the optical fiber-embedded PC steel strand is 3.5% or more, if the optical fiber and the resin do not break, these members can be evaluated to have an elongation at break of 3.5% or more.

A tensile strength of the optical fiber is preferably 100 MPa or more and 1,500 MPa or less and more preferably 120 MPa or more and 1,300 MPa or less.

The optical fiber-embedded PC steel strand is, in use, set in a concrete structure and the like. Then, the ends of the optical fiber-embedded PC steel strand are pulled, thereby introducing a tension thereto and applying a compressive force into the concrete structure. In this way, a tensile stress occurring when the concrete structure receives a load is controlled, thereby preventing formation of cracks and the like in the concrete structure. When the optical fiber-embedded PC steel strand is pulled for introduction of the tension, a force is also applied to the optical fiber. When the tensile strength of the optical fiber is 100 MPa or more, it is possible to prevent breakage of the optical fiber if a usual amount of the tension is introduced to the optical fiber-embedded PC steel strand. However, because there is no need to excessively increase the tensile strength of the optical fiber, the tensile strength of the optical fiber is preferably 1,500 MPa or less.

Note that, in the present specification, the tensile strength of the optical fiber and the resin is calculated by dividing a tensile strength value by a cross-sectional area of a sample thereof subjected to evaluation. The tensile strength value is measured using a tensile tester at a tensile speed of 5 mm/min and a supporting distance of 150 mm.

(1-3) Resin

In the optical fiber-embedded PC steel strand 10 of the present embodiment, the optical fiber 12 is fixed with a resin 13 in the twist groove 21 of the PC steel strand 11.

The inventors of the present invention measured an optical fiber for a strain distribution after introduction of a uniform tension to an optical fiber-embedded PC steel strand, and then studied a cause of occurrence of the difference in the measured value of strain in accordance with the positions along the longitudinal direction of the optical fiber-embedded PC steel strand. As a result, they have found that the cause of occurrence of the difference in the measured value is variation in position of the optical fiber disposed in a twist groove in a plurality of cross sections of the optical fiber-embedded PC steel strand that are perpendicular to the longitudinal direction of the optical fiber-embedded PC steel strand.

Hitherto, for example, an optical fiber-embedded PC steel strand has been produced in the following manner. Specifically, an optical fiber is disposed in a resin or the like to form an optical fiber member. The optical fiber member is disposed in the twist groove of a PC steel strand, followed by fixing with an adhesive or the like.

However, there is difficulty in completely matching the outer shape of the optical fiber member with the shape of the twist groove and maintaining the shape thereof until the optical fiber member is fixed in the twist groove. Therefore, due to, for example, occurrence of a gap between the optical fiber member and the twist groove, the position in the twist groove of the optical fiber member or the optical fiber disposed in the optical fiber member may become unstable.

Also, the optical fiber member, which includes the optical fiber, the resin, and the like, has higher rigidity than the rigidity of the optical fiber alone. Therefore, there is difficulty in disposing and fixing the optical fiber member in the twist groove of the PC steel strand. Due to the above-described difficulty in attaching the optical fiber member to the PC steel strand, the position in the twist groove of the optical fiber member or the optical fiber disposed in the optical fiber member may become unstable.

In view thereof, in the optical fiber-embedded PC steel strand of the present embodiment, the optical fiber is preferably fixed with the resin in the twist groove of the PC steel strand. That is, in the optical fiber-embedded PC steel strand of the present embodiment, the optical fiber is preferably directly disposed in the twist groove without being previously coated with the resin or the like, followed by fixing with the resin.

No particular limitation is imposed on the resin 13. However, the resin 13 is preferably a resin that is curable in a short time so as to prevent displacement of the position of the optical fiber 12 after disposition of the optical fiber 12 at a desired position in the twist groove 21 of the PC steel strand 11.

Specifically, for example, the curing time of the resin 13 is preferably one minute or shorter and more preferably 50 seconds or shorter.

Use, as the resin 13, of the resin having a curing time of one minute or shorter can shorten the time required until the fixing with the resin after the optical fiber 12 has been disposed at a desired position in the twist groove 21. Therefore, it is possible to prevent displacement of the position of the optical fiber 12 which would otherwise occur before the resin 13 is cured. As a result, in the plurality of cross sections of the optical fiber-embedded PC steel strand that are perpendicular to the longitudinal direction of the optical fiber-embedded PC steel strand, it is possible to set the optical fiber 12 at a desired position in the twist groove 21 with high accuracy, e.g., it is possible to set the optical fiber 12 with high accuracy at a position in the twist groove 21 at which the optical fiber 12 is initially disposed.

No particular limitation is imposed on the lower limit of the curing time of the resin 13. However, the curing time is preferably 0.1 seconds or longer and more preferably 0.3 seconds or longer. When the curing time thereof is 0.1 seconds or longer, for example, it is possible to prevent clogging of a nozzle or the like that supplies the resin 13.

The above-described curing time means a time from the start of a curing treatment under curing conditions predetermined in accordance with the type of the resin, until the resin is cured. Examples of the curing conditions predetermined in accordance with the type of the resin include heating conditions for thermosetting resins such as a heating temperature, and irradiating conditions of ultraviolet rays for UV-curable resins. Also, the expression "the resin is cured" means that when the surface of a test sample of the resin is lightly touched with a fingertip, the resin does not become attached to the fingertip.

No particular limitation is imposed on the resin 13. However, a thermosetting resin, a UV-curable resin, a two-liquid mixing-type resin, or the like can be used. The two-liquid mixing-type resin means a resin that starts curing upon mixing of two types of liquid.

As the resin 13, the UV-curable resin can be especially preferably used. A reason for this is as follows. Specifically, the UV-curable resin can be cured only by irradiation with ultraviolet rays, and compared to the case of performing heating or the like, it is possible to suppress impacts to members other than the resin 13, such as the optical fiber. Also, compared to the thermosetting resin, the two-liquid mixing-type resin, or the like, the UV-curable resin often has a short curing time. Thus, it is possible to especially prevent displacement of the position of the optical fiber 12 in the twist groove 21 which would otherwise occur before the resin 13 is cured.

Also, the elongation at break of the resin is preferably 3.5% or more.

The resin can preferably conform to deformation of the PC steel strand. According to JIS G 3536 (2014), the elongation at break of the PC steel strand is 3.5% or more. Therefore, the resin having an elongation at break of 3.5% or more can deform in accordance with deformation of the PC steel strand even if a force for the PC steel strand or the resin to break is applied to the optical fiber-embedded PC steel strand. Accordingly, when the elongation at break of the resin is 3.5% or more, the resin readily deforms in accordance with the PC steel strand of the optical fiber-embedded PC steel strand to which the tension has been introduced, and durability of the optical fiber-embedded PC steel strand can be improved.

A tensile strength of the resin is preferably 100 MPa or more and 300 MPa or less and more preferably 120 MPa or more and 250 MPa or less.

The optical fiber-embedded PC steel strand is, in use, set in the concrete structure and the like. Then, the ends of the optical fiber-embedded PC steel strand are pulled, thereby introducing a tension thereto and applying a compressive force into the concrete structure. In this way, a tensile stress occurring when the concrete structure receives a load is controlled, thereby preventing formation of cracks and the like in the concrete structure. When the optical fiber-embedded PC steel strand is pulled for introducing the tension, a force is also applied to the resin that fixes the optical fiber. When the tensile strength of the resin is 100 MPa or more, it is possible to prevent breakage of the resin if a usual amount of the tension is introduced to the optical fiber-embedded PC steel strand. However, because there is no need to excessively increase the tensile strength of the resin, the tensile strength of the resin is preferably 300 MPa or less.

(2) Regarding the Structure of Optical Fiber-Embedded PC Steel Strand

Next, a configuration example of a suitable structure of the optical fiber-embedded PC steel strand will be described.

As illustrated in FIG. 2, in the cross section of the optical fiber-embedded PC steel strand 10 perpendicular to the longitudinal direction of the PC steel strand 11, i.e., in the cross section thereof perpendicular to a center axis A, the optical fiber 12 can be disposed in the twist groove 21 of the PC steel strand 11 and fixed with the resin 13 as described above.

By disposing the optical fiber 12 in the twist groove 21 of the PC steel strand 11, the optical fiber 12 readily follows stretching of the PC steel strand 11. Therefore, the strain occurring in the PC steel strand 11 is reflected to the optical fiber 12, and the strain or the like of the PC steel strand 11 can be measured using the optical fiber 12 with high accuracy.

No particular limitation is imposed on the amount of the resin 13 used when the optical fiber 12 is fixed with the resin 13. For example, it is enough to dispose the resin 13 such that the optical fiber 12 can be fixed to the PC steel strand 11. However, as illustrated in FIG. 2, in the cross section perpendicular to the longitudinal direction of the PC steel strand 11, the outer surface of the optical fiber 12 is preferably covered with the resin 13.

By covering the outer surface of the optical fiber 12 with the resin 13, the optical fiber 12 can be firmly fixed to the PC steel strand 11, and can especially accurately conform to stretching of the PC steel strand 11. Therefore, the strain occurring in the PC steel strand 11 is especially accurately reflected to the optical fiber 12, and the strain of the PC steel strand 11 can be measured using the optical fiber 12 with especially high accuracy. Also, by covering the outer surface of the optical fiber 12 with the resin 13, it is possible to protect the optical fiber 12 and prevent damage to the optical fiber 12.

(2-1) Coefficient of Variation in Distance Between the Common Tangent of the Two PC Steel Wires that Form the Twist Groove and are Next to Each Other, and the Center of the Optical Fiber In the optical fiber-embedded PC steel strand of the present embodiment, the coefficient of variation in distance between the common tangent of the two PC steel wires that form the twist groove and are next to each other, and the center of the optical fiber is preferably 0.5 or less, as measured in 10 cross sections of the PC steel strand that are perpendicular to the longitudinal direction of the PC steel strand. The coefficient of variation is more preferably 0.4 or less.

As described above, the inventors of the present invention measured a strain distribution along the longitudinal direction of an optical fiber-embedded PC steel strand to which a uniform tension has been introduced, and then studied a cause of occurrence of the difference in the measured value of strain in accordance with the positions along the longitudinal direction of the optical fiber-embedded PC steel strand. As a result, they have found that the cause of occurrence of the difference in the measured value, i.e., the cause of occurrence of the range of variation, is variation in position of the optical fiber disposed in a twist groove in a plurality of cross sections of the optical fiber-embedded PC steel strand that are perpendicular to the longitudinal direction of the optical fiber-embedded PC steel strand.

Here, reference will be made to FIG. 3 that is an enlarged view of the vicinity of the optical fiber 12 of FIG. 2. Like in FIG. 2, FIG. 3 is a cross-sectional view of the optical fiber-embedded PC steel strand 10 and the PC steel strand 11 in a plain perpendicular to the longitudinal direction thereof.

As illustrated in FIG. 3, in the optical fiber-embedded PC steel strand 10 of the present embodiment, a distance L12 denotes a distance between a common tangent 311 of the two PC steel wires 111B that form the twist groove 21 of the PC steel strand 11 and are next to each other, and a center 121 of the optical fiber 12. The fact that the coefficient of variation in the distance L12 measured in the 10 cross sections of the PC steel strand 11 that are perpendicular to the longitudinal direction of the PC steel strand 11 is 0.5 or less means suppressed variation in the distance L12 in the 10 measured cross sections. That is, this means suppressed variation in position of the optical fiber 12 in the cross section of the PC steel strand perpendicular to the longitudinal direction of the PC steel strand. Therefore, when a tension is uniformly introduced to the optical fiber-embedded PC steel strand and the resulting optical fiber-embedded PC steel strand is measured for a strain distribution along the longitudinal direction thereof, it is possible to suppress occurrence of the difference in the measured value of strain in accordance with the positions along the longitudinal direction, i.e., a range of variation. Therefore, use of the optical fiber-embedded PC steel strand enables accurate measurement of strain.

As illustrated in FIG. 3, the common tangent 311 is, in the above-described cross section, a common tangent that is drawn so as to contact the two PC steel wires 111B at two points and so that the two points are positioned on an external exposed surface of the PC steel strand 11.

Note that, the coefficient of variation is a parameter indicating a degree of variation in measured values. The coefficient of variation is a value calculated by dividing a standard deviation of the measured values by an average value of the measured values, and is a dimensionless number.

No particular limitation is imposed on how to select the 10 cross sections used for measuring the distance L12. However, it is preferable to select the cross sections so that the distances between the cross sections for evaluation are equal to each other. Although in accordance with the length of a test piece, for example, it is preferable to select the cross sections for evaluation so that the distance between the cross sections next to each other is 50 cm.

No particular limitation is imposed on the lower limit of the above-described coefficient of variation. However, for example, the coefficient of variation is preferably 0.05 or more and more preferably 0.1 or more. When the coefficient of variation is 0.05 or more, it is possible to shorten the time required for positioning the optical fiber in the production of the optical fiber-embedded PC steel strand, and thus can increase productivity.

When the optical fiber-embedded PC steel strand of the present embodiment includes a plurality of optical fibers, at least one of the optical fibers preferably satisfies the above-described coefficient of variation and more preferably all of the optical fibers satisfy the above-described coefficient of variation.

(2-2) Regarding the Position of the Optical Fiber in the Twist Groove

By disposing the optical fiber so as to satisfy the above-described coefficient of variation, it is possible to suppress variation in position of the optical fiber along the longitudinal direction of the optical fiber-embedded PC steel strand. As a result, it is possible to measure the strain using the optical fiber-embedded PC steel strand with high accuracy.

However, in view that the optical fiber better follows stretching of the PC steel strand and accurately reflects the strain occurring in the PC steel strand to the optical fiber, the entire optical fiber is preferably housed in the twist groove of the PC steel strand. More preferably, the optical fiber is disposed especially at a position close to the bottom of the twist groove of the PC steel strand.

For example, as illustrated in FIG. 3, in a cross section of the optical fiber-embedded PC steel strand 10 perpendicular to the longitudinal direction of the PC steel strand 11, a straight line 312 is a straight line that is parallel to the common tangent 311 and 0.1 mm apart from the common tangent 311 inward of the PC steel strand 11. As illustrated in FIG. 3, the straight line 312 is disposed at a position closer to a center A1 of the PC steel strand 11 than the common tangent 311 is. The center A1 is the center of a circumscribed circle C1 of the PC steel strand 11 in the cross section perpendicular to the longitudinal direction of the PC steel strand 11 (see FIG. 2). Also, a distance L312 between the common tangent 311 and the straight line 312 in FIG. 3 is 0.1 mm.

In this case, the optical fiber 12 is preferably positioned in a region 33 enclosed by the straight line 312 and surfaces 32 of the two PC steel wires 111B that form the twist groove 21 and are next to each other. Note that, the fact that the optical fiber 12 is positioned in the region 33 means that the entire optical fiber 12 is positioned in the region 33 in the cross section for evaluation.

The evaluation of the position of the optical fiber 12 in the twist groove 21 is preferably performed in a plurality of cross sections. For example, the evaluation thereof is performed in 10 cross sections. The 10 cross sections for use are preferably, for example, the same 10 cross sections as used for determining the coefficient of variation in the distance L12 between the common tangent 311 of the two PC steel wires 111B that form the twist groove 21 and are next to each other, and the center 121 of the optical fiber 12.

Preferably, in eight or more cross sections of the 10 evaluated cross sections, the optical fiber 12 is positioned in the region 33. More preferably, in nine or more cross sections thereof, the optical fiber 12 is positioned in the region 33. Even more preferably, in all of the evaluated cross sections, the optical fiber 12 is positioned in the region 33.

By disposing the optical fiber 12 in the region 33, it is possible to dispose the optical fiber 12 in proximity to the PC steel strand 11, and measure the strain of the PC steel strand with higher accuracy.

When the optical fiber-embedded PC steel strand of the present embodiment includes a plurality of optical fibers, at least one of the optical fibers is preferably disposed in the region 33 and more preferably all of the optical fibers are disposed in the region 33.

(2-3) Regarding the Number of Optical Fibers and the Disposition Thereof

No particular limitation is imposed on the number of the optical fibers included in the optical fiber-embedded PC steel strand 10 of the present embodiment. The optical fiber-embedded PC steel strand 10 of the present embodiment may include only one optical fiber, or two or more optical fibers. However, the optical fiber-embedded PC steel strand 10 of the present embodiment preferably includes two or more optical fibers.

A reason for this is as follows. Specifically, when the optical fiber-embedded PC steel strand includes two or more optical fibers, even if one of the optical fibers is damaged, for example, during construction, due to aging, or the like, the strain measurement and the like can be performed using another optical fiber.

Although the strain and the temperature of the PC steel strand can be measured based on the scattering light using the optical fiber, the two or more optical fibers may be required, for example, when the strain and the temperature are measured at the same time, or in accordance with measurement systems of the strain and the temperature. Therefore, in order to adapt to various measurement systems, the optical fiber-embedded PC steel strand preferably includes two or more optical fibers.

A configuration example of the optical fiber-embedded PC steel strand including two or more optical fibers will be described with reference to FIG. 2. For example, the optical fiber-embedded PC steel strand 10 preferably includes a pair of optical fibers 12A and 12B at point-symmetric positions with a point of symmetry being the center A1 of the circumscribed circle C1 of the PC steel strand 11 in the cross section perpendicular to the longitudinal direction of the PC steel strand 11. That is, for example, the optical fiber-embedded PC steel strand 10 preferably includes the pair of optical fibers 12A and 12B at both end portions of the diameter of the circumscribed circle C1 of the PC steel strand 11. Specifically, the optical fibers 12A and 12B can be respectively disposed so as to be along a twist groove 21A and a twist groove 21B that are at the point-symmetric positions with the point of symmetry being the center A1 of the circumscribed circle C1 of the PC steel strand 11.

As described above, by disposing the pair of optical fibers 12A and 12B at the point-symmetric positions with the point of symmetry being the center A1 of the circumscribed circle C1 of the PC steel strand 11, it is possible to dispose the optical fibers apart from each other in the optical fiber-embedded PC steel strand 10. Therefore, for example, even if the optical fiber 12A is damaged, it is possible to suppress damage to the optical fiber 12B disposed apart therefrom.

Note that, when the optical fiber-embedded PC steel strand includes a plurality of optical fibers, the disposition of the optical fibers is not limited to the above disposition. For example, a plurality of optical fibers may be disposed in the same twist groove.

(3) Regarding the Anticorrosive Coating

The optical fiber-embedded PC steel strand of the present embodiment may further include the anticorrosive coating that coats the outer surface of the PC steel strand.

FIG. 4 is a cross-sectional view of the optical fiber-embedded PC steel strand 40 including the anticorrosive coating, the cross-sectional view being in a plane perpendicular to the longitudinal direction of the PC steel strand 11. Note that, the optical fiber-embedded PC steel strand 40 may be formed to have the same configuration as the configuration of the above-described optical fiber-embedded PC steel strand, except that an anticorrosive coating 41 and an outer coating 42 as described below are included.

The optical fiber-embedded PC steel strand 40 including the anticorrosive coating may include the anticorrosive coating 41 that coats the outer surface 11A of the PC steel strand 11.

When the optical fiber-embedded PC steel strand includes the anticorrosive coating 41, the anticorrosive coating 41 can protect the PC steel strand 11 from an external environment and suppress corrosion of the PC steel strand 11. An outer surface 41A of the anticorrosive coating 41 may have, for example, a shape along the outer profile of the PC steel strand 11. However, this shape is by no means a limitation.

No particular limitation is imposed on the material (quality of material) of the anticorrosive coating 41. However, for example, a resin excellent in corrosion resistance or grease can be used. Examples of the resin include epoxy resins and polyethylene resins. As the polyethylene resin, especially, it is preferable to use a high-density polyethylene resin. The high-density polyethylene resin means a material having a density of 0.942 g/cm$^3$ or higher. The density of the material is measured in accordance with JIS K 6922 (2018).

Note that, the anticorrosive coating may be disposed in the inner gap 22. When the anticorrosive coating is disposed in the inner gap 22, grease can be suitably used as the material of the anticorrosive coating. The grease may include, for example, petroleum-based hydrocarbon, thickeners, lubricating oil additives, and the like. As described above, the grease may be used as the anticorrosive coating 41 that coats the outer surface 11A of the PC steel strand 11.

The optical fiber-embedded PC steel strand 40 may include the outer coating 42 that further coats the outer surface 41A of the anticorrosive coating 41. Note that, the anticorrosive coating 41 and the outer coating 42 may be formed of the same material, but are preferably formed of different materials. A reason for this is as follows. Specifically, the outer coating 42 can have the function of preventing degradation mainly due to ultraviolet rays. However, when the anticorrosive coating 41 is formed only of the material for the outer coating 42, there is a risk of raising in cost.

No particular limitation is imposed on the material (quality of material) of the outer coating 42. However, examples thereof include polyethylene resins. As the polyethylene resin, especially, it is preferable to use a high-density polyethylene resin.

2. Strain Measurement Method and Strain Measurement Device

Configuration examples of the strain measurement method and the strain measurement device of the present embodiment will be described.

(1) Strain Measurement Method

The configuration example of the strain measurement method of the present embodiment will be described.

The strain measurement method of the present embodiment is a strain measurement method of measuring strain of the PC steel strand using the optical fiber-embedded PC steel strand according to the present disclosure, and may include the following step.

A strain measurement step of performing measurement of strain of the PC steel strand based on scattering light using the optical fiber included in the optical fiber-embedded PC steel strand.

Also, the strain measurement method of the present embodiment may measure a temperature using the optical fiber and correct the strain measured in the strain measurement step.

In this case, the strain measurement method of the present embodiment may further include the following steps.

A temperature measurement step of measuring a temperature based on scattering light using the optical fiber included in the optical fiber-embedded PC steel strand.

A correction step of correcting the strain of the PC steel strand measured in the strain measurement step using the temperature measured in the temperature measurement step.

Each of the steps will be described.

(Strain Measurement Step)

In the strain measurement step, the measurement of strain can be performed using the optical fiber included in the optical fiber-embedded PC steel strand according to the present disclosure. Note that, in the strain measurement step, it is possible to measure the strain at a given position along the longitudinal direction of the optical fiber, and a strain distribution along the longitudinal direction of the optical fiber.

No particular limitation is imposed on the scattering light used in the strain measurement step. However, for example, one or more selected from Brillouin scattering light, Rayleigh scattering light, and Raman scattering light can be used.

No particular limitation is imposed on the measurement system of strain. However, examples thereof include BOCDA (Brillouin Optical Correlation Domain Analysis), BOTDR (Brillouin Optical Time Domain Reflectometry), FBG (Fiber Bragg Grating), BOTDA (Brillouin Optical Time Domain Analysis), and BOCDR (Brillouin Optical Correlation Domain Reflectometry).

The number of the optical fibers included in the optical fiber-embedded PC steel strand used for the measurement may be selected in accordance with the measurement system and the like. For example, when the measurement system is BOCDA or BOTDA, the number of the optical fibers is preferably an even number of two or more, or when the measurement system is BOTDR, FBG, or BOCDR, the number of the optical fibers is preferably one or more.

After a scattering light measurement device adapted for the measurement system is connected to the optical fiber of the optical fiber-embedded PC steel strand, the strain measurement can be performed at a given timing.

(Temperature Measurement Step)

In the temperature measurement step, the measurement of a temperature can be performed using the optical fiber included in the optical fiber-embedded PC steel strand according to the present disclosure. Note that, in the temperature measurement step, it is possible to measure the temperature at a given position along the longitudinal direction of the optical fiber, and a temperature distribution along the longitudinal direction of the optical fiber. However, as described below, because the strain measured in the strain measurement step is corrected with the temperature measured in the temperature measurement step, it is preferable to measure the temperature and the temperature distribution at positions corresponding to the positions at which the strain and the strain distribution are measured in the strain measurement step.

No particular limitation is imposed on the scattering light used in the temperature measurement step. However, for example, one or more selected from Brillouin scattering light, Rayleigh scattering light, and Raman scattering light can be used. No particular limitation is imposed on the measurement system of the temperature. However, examples thereof include BOCDA, BOTDR, FBG, BOTDA, BOCDR, and ROTDR (Raman Optical Time Domain Reflectmeter).

The number of the optical fibers included in the optical fiber-embedded PC steel strand used for the measurement may be selected in accordance with the measurement system and the like. For example, when the measurement system is BOCDA or BOTDA, the number of the optical fibers is preferably an even number of two or more, or when the measurement system is BOTDR, FBG, BOCDR, or ROTDR, the number of the optical fibers is preferably one or more.

After a scattering light measurement device adapted for the measurement system is connected to the optical fiber of the optical fiber-embedded PC steel strand, the temperature measurement can be performed at a given timing.

Note that, the scattering light may be influenced not only by the strain occurring in the optical fiber in response to the strain of the PC steel strand, but also by the ambient temperature of the optical fiber. Thus, the type of the scattering light used in the strain measurement step and the type of the scattering light used in the temperature measurement step are preferably different from each other.

For example, preferably, in the strain measurement step, the measurement of the strain is performed using the optical fiber based on Brillouin scattering light or Rayleigh scattering light, while in the temperature measurement step, the measurement of the temperature is performed using the optical fiber based on Raman scattering light. In this way, by using different types of scattering light in the strain measurement step and the temperature measurement step, it is possible to measure both of the strain and the temperature with high accuracy.

When the strain measurement step and the temperature measurement step are performed, the optical fiber-embedded PC steel strand according to the present disclosure can be used. However, the optical fiber-embedded PC steel strand preferably includes a plurality of optical fibers. For example, the optical fiber-embedded PC steel strand preferably includes, as the optical fibers, the strain measurement optical fiber and the temperature measurement optical fiber.

A reason for this is as follows. Specifically, use of the optical fiber-embedded PC steel strand including the strain measurement optical fiber and the temperature measurement optical fiber can measure the strain and the temperature at the same time. This can increase the measurement accuracy and shorten the time required for the measurement.

The strain measurement optical fiber or the temperature measurement optical fiber is preferably one or more optical fibers selected from single-mode optical fibers, multi-mode optical fibers, and polarization maintaining optical fibers.

Especially, optical fibers suitable for the scattering light used in the strain measurement step and the temperature measurement step are preferably selected as the strain measurement optical fiber and the temperature measurement optical fiber.

For example, when Brillouin scattering light or Rayleigh scattering light is used, it is preferable to use the single-mode optical fiber, or when Raman scattering light is used, it is preferable to use the multi-mode optical fiber. A reason for this is as follows. Specifically, when the measurement is performed based on Brillouin scattering light or Rayleigh scattering light, an especially sharp peak can be obtained by the use of the single-mode optical fiber. Also, when the measurement is performed based on Raman scattering light, an especially high peak intensity can be obtained by the use of the multi-mode optical fiber.

As described above, for example, in the strain measurement step, it is preferable to use Brillouin scattering light or Rayleigh scattering light. Thus, the strain measurement optical fiber is preferably the single-mode optical fiber. Also, in the temperature measurement step, it is preferable to use Raman scattering light. Thus, the temperature measurement optical fiber is preferably the multi-mode optical fiber.

In this way, by using, in each of the measurement steps, the optical fiber of a type suitable for the scattering light used, it is possible to especially increase the measurement accuracy.

(Correction Step)

In the correction step, the strain measured in the strain measurement step can be corrected using the temperature measured in the temperature measurement step.

In the correction step, for example, the strain after correction can be calculated by the following formula (1).

$$\text{(Strain (\%) after correction)} = \text{(strain (\%) measured in the strain measurement step)} - \text{(temperature (°C.) measured in the temperature measurement step)} \times \text{(temperature coefficient (\%/° C.))} \quad (1)$$

Note that, instead of the "temperature measured in the temperature measurement step" in the above formula (1), a change in temperature from a reference temperature may be used.

The temperature coefficient can be previously calculated using, for example, the same optical fiber-embedded PC steel strand as used in the measurement based on a relationship between known temperatures and known quantities of strain.

By performing the temperature measurement step and the correction step in addition to the strain measurement step, it is possible to correct the measured strain and strain distribution with the temperature. Therefore, performing the temperature measurement step and the correction step can measure strain with especially high accuracy.

According to the strain measurement method of the present embodiment, which uses the optical fiber-embedded PC steel strand according to the present disclosure, it is possible to suppress an error and measure strain and the like with high accuracy.

Also, according to the strain measurement method of the present embodiment, the measurements of the strain and the temperature can be performed using the optical fiber-embedded PC steel strand. Therefore, the strain and the temperature can be readily measured even if the measurements thereof are hard to perform from the exterior, e.g., when the optical fiber-embedded PC steel strand is, for example, embedded. Also, for example, compared to the case of measuring the temperature using a thermometer other than the optical fiber-embedded PC steel strand, it is possible to correct the strain with the temperature with high accuracy and measure the strain with high accuracy because a measurement point of the strain and a measurement point of the temperature are in proximity to each other.

Moreover, according to the strain measurement method of the present embodiment, the strain and the temperature are measured using the scattering light. Thus, the degree of burden in performing an on-site measurement is small, and it is possible to readily perform the measurement.

(2) Strain Measurement Device

Next, a configuration example of the strain measurement device that can be suitably used for the strain measurement method will be described.

The strain measurement device of the present embodiment may include the optical fiber-embedded PC steel strand according to the present disclosure and the scattering light measurement device connected to the optical fiber-embedded PC steel strand.

A specific configuration example of the scattering light measurement device will be described with reference to FIG. 5 and FIG. 6. Note that, in order to illustrate how the optical fiber-embedded PC steel strand is connected, FIG. 5 and FIG. 6 illustrate strain measurement devices 500 and 600 including the optical fiber-embedded PC steel strand.

Figure 5:
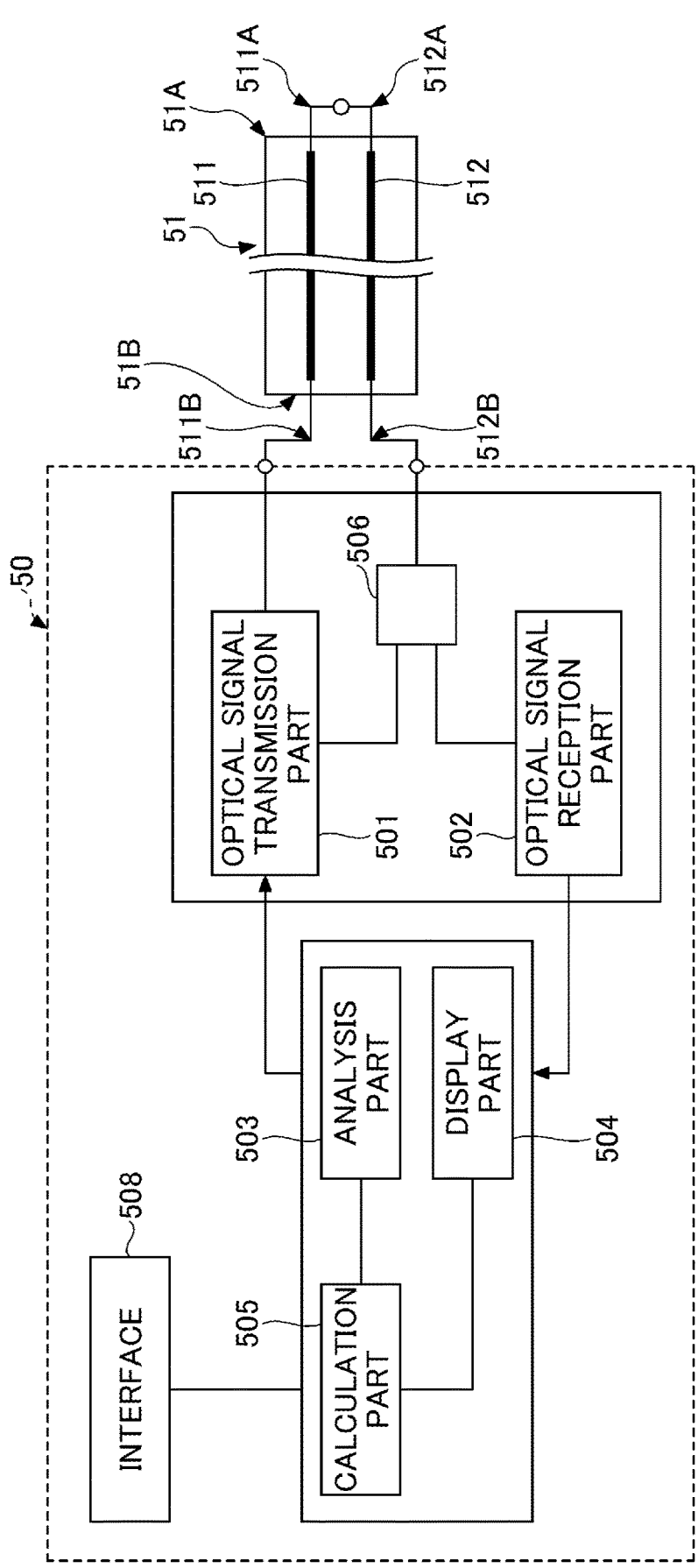
FIG. 5 is an explanatory view of a scattering light measurement device according to one embodiment of the present disclosure.

A scattering light measurement device 50 as illustrated in FIG. 5 is a type of a scattering light measurement device configured to input and output laser beams to and from both ends of the optical fiber. This can be used for performing the measurement through, for example, BOCDA or BOTDA.

Figure 6:
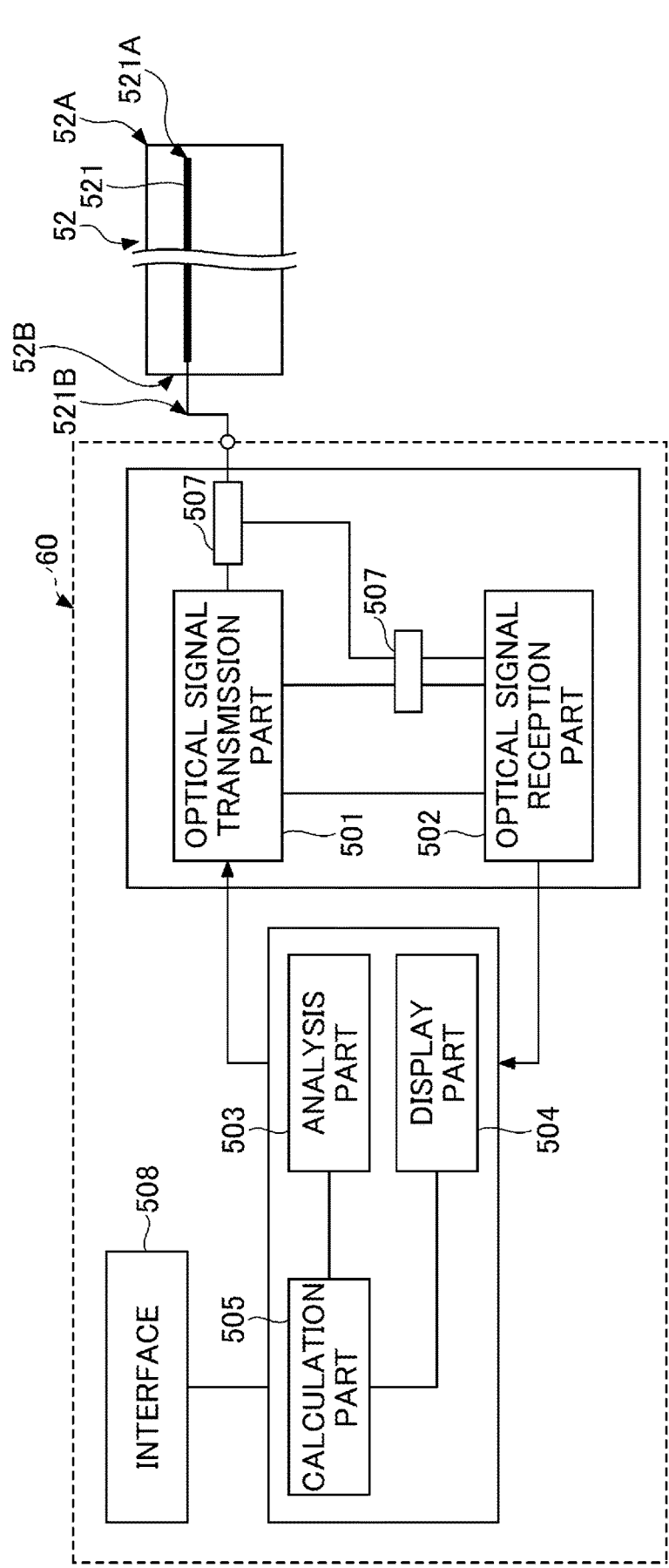
FIG. 6 is an explanatory view of a scattering light measurement device according to one embodiment of the present disclosure.

A scattering light measurement device 60 as illustrated in FIG. 6 is a type of a measurement device configured to input and output laser beams to and from one end of the optical fiber. This can be used for performing the measurement through, for example, BOTDR, FBG, BOCDR, or ROTDR.

The scattering light measurement device 50 or 60 includes an optical signal transmission part 501 configured to transmit an optical signal, and an optical signal reception part 502 configured to receive the optical signal from the optical fiber. Also, the scattering light measurement device 50 or 60 includes an analysis part 503 configured to analyze the optical signal received by the optical signal reception part 502 and obtain one or more types of information selected from the strain and the temperature of the optical fiber. If necessary, the scattering light measurement device 50 or 60 may include a display part 504 configured to display the information obtained by the analysis part 503.

The optical signal transmission part 501 and the optical signal reception part 502 may be configured as, for example, an integrated measurement device. The analysis part 503 is, for example, a calculation device such as a computer, and the display part 504 is, for example, a display monitor configured to display, on a screen, the calculation result obtained by the calculation device. A personal computer or the like that integrally includes the analysis part 503 and the display part 504 may be used.

In optical fibers 511 and 512 of the optical fiber-embedded PC steel strand 51 that are connected to the scattering light measurement device 50, first ends 511A and 512A of the optical fibers are routed out of a first end 51A of the optical fiber-embedded PC steel strand. The first ends 511A and 512A are connected to each other. Also, in the optical fibers 511 and 512 included in the optical fiber-embedded PC steel strand 51, second ends 511B and 512B of the optical fibers are pulled out of a second end 51B of the optical fiber-embedded PC steel strand 51 and connected to the scattering light measurement device 50.

Also, in an optical fiber 521 of an optical fiber-embedded PC steel strand 52 connected to the scattering light measurement device 60, a first end 521A of the single optical fiber 521 is disposed at a first end 52A of the optical fiber-embedded PC steel strand 52. A second end 521B of the optical fiber 521 included in the optical fiber-embedded PC steel strand 52 is pulled out of a second end 52B of the optical fiber-embedded PC steel strand 52 and connected to the scattering light measurement device 60.

In the scattering light measurement device 50 or 60, the optical signal transmission part 501, the optical signal reception part 502, and the optical fibers 511, 512, and 521 are appropriately connected to each other via a light splitter 506, a coupler 507, or the like.

Note that, the strain measurement device of the present embodiment may include the scattering light measurement device adapted for the measurement system used for measuring the strain and the temperature using the scattering light, and may include both of the scattering light measurement device 50 and the scattering light measurement device 60.

The optical fiber-embedded PC steel strand used for the above-described strain measurement method may include the strain measurement optical fiber and the temperature measurement optical fiber. Therefore, for example, the strain measurement device of the present embodiment may include the scattering light measurement device connected to the strain measurement optical fiber and the scattering light measurement device connected to the temperature measurement optical fiber. Also, for example, the strain measurement device of the present embodiment may include a single scattering light measurement device that may be configured to change the connection of the optical fiber and the like to the interior of the scattering light measurement device or the scattering light measurement device between the measurement of the strain and the measurement of the temperature.

Also, in the correction step of the above-described strain measurement method, the strain measured in the strain measurement step can be corrected with the temperature measured in the temperature measurement step. Therefore, the scattering light measurement device 50 or 60 may include a calculation part 505 configured to perform calculation for the correction. When the strain measurement device of the present embodiment includes a plurality of scattering light measurement devices, the plurality of scattering light measurement devices may share the single calculation part 505. Also, the scattering light measurement device 50 or 60 may be provided with a plurality of calculation parts 505 and may be configured to share information necessary for correction between the plurality of calculation parts 505. Note that, the calculation part 505 may be provided separately from the scattering light measurement device.

Also, the scattering light measurement device 50 or 60 may include an interface 508 configured to output measurement data such as data of the measured strain and temperature, the corrected strain, and the like, to the exterior. No particular limitation is imposed on the configuration of the interface 508, and examples thereof include interfaces for LAN (Local Area Network) and various interfaces for connecting to recording media and the like. The scattering light measurement device including the interface can output data of the measured strain and temperature, data of the corrected strain, and the like, to the exterior. For example, the scattering light measurement device may be configured to output data of the above strain and the like to an external information terminal from the interface via a network or the like. With this configuration, it is possible to readily obtain data such as strain of a concrete structure in a remote place.

According to the above-described strain measurement device of the present embodiment, which uses the optical fiber-embedded PC steel strand according to the present disclosure, it is possible to suppress a range of variation in measurement value of strain in accordance with positions along the longitudinal direction of the optical fiber-embedded PC steel strand, and to measure strain and the like with high accuracy.

According to the strain measurement device of the present embodiment, the measurements of the strain and the temperature can be performed using the optical fiber-embedded PC steel strand. Therefore, the strain and the temperature can be readily measured even if the measurements thereof are hard to perform from the exterior, e.g., when the optical fiber-embedded PC steel strand is, for example, embedded. Also, for example, compared to the case of measuring the temperature using a thermometer other than the optical fiber-embedded PC steel strand, it is possible to correct the strain with the temperature with high accuracy because a measurement point of the strain and a measurement point of the temperature are in proximity to each other.

Moreover, according to the strain measurement device of the present embodiment, the strain and the temperature are measured using the scattering light. Thus, the degree of burden in performing an on-site measurement is small, and it is possible to readily perform the measurement.

3. Production Method for the Optical Fiber-Embedded PC Steel Strand

Next, a production method for the optical fiber-embedded PC steel strand of the present embodiment will be described. The production method for the optical fiber-embedded PC steel strand of the present embodiment may include the disposing step and the fixing step as described below.

The disposing step can dispose an optical fiber in a twist groove that is a groove between two PC steel wires of a plurality of PC steel wires twisted together to form a PC steel strand, the two PC steel wires being disposed at an outer surface of the PC steel strand and being next to each other.

The fixing step can fix the optical fiber in the twist groove with a resin.

In the disposing step, a tension of more than 0 N and 20 N or less can be applied to the optical fiber.

Each of the steps included in the production method for the optical fiber-embedded PC steel strand of the present embodiment will be described with reference to FIG. 7.

Figure 7:
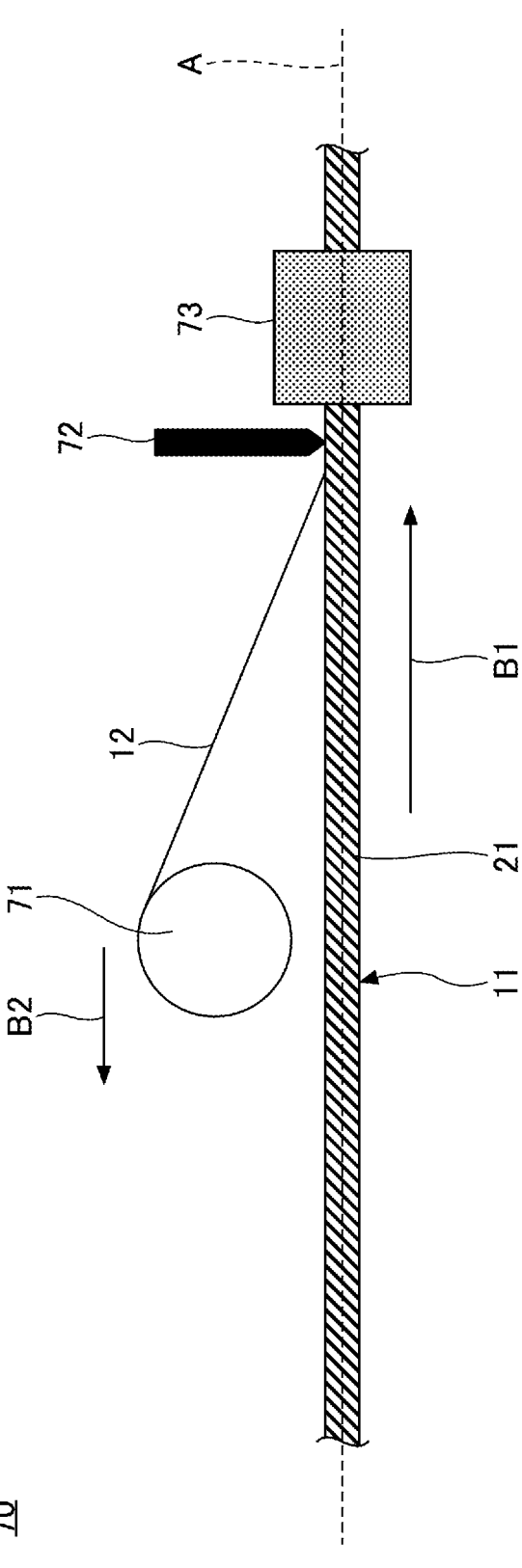
FIG. 7 is an explanatory view of a production apparatus for the optical fiber-embedded PC steel strand.

FIG. 7 schematically illustrates a production apparatus 70 for the optical fiber-embedded PC steel strand that performs the production method for the optical fiber-embedded PC steel strand of the present embodiment. In FIG. 7, the PC steel strand 11 is transferred from left to right along an arrow B1. No particular limitation is imposed on the method for transferring the PC steel strand 11. For example, the PC steel strand 11 may be transferred in a roll-to-roll system, or may be transferred by pulling the PC steel strand 11 with a winch or the like.

(1) Disposing Step

In the disposing step, as described above, the optical fiber 12 can be disposed in the twist groove 21 of the PC steel strand 11.

As described above, hitherto, the optical fiber member is formed by coating the outer surface of the optical fiber with the resin or the like, and then is disposed in the twist groove 21 of the PC steel strand 11. Meanwhile, in the production method for the optical fiber-embedded PC steel strand of the present embodiment, the optical fiber 12 is directly disposed in the twist groove 21. The optical fiber has excellent handleability because the optical fiber has rigidity lower than the optical fiber member. Therefore, compared to the optical fiber member, use of the optical fiber alone can increase workability in the disposing step.

However, in the disposing step, a tension is applied to the optical fiber, e.g., a tension of more than 0 N and 20 N or less is preferably applied to the optical fiber, and more preferably a tension of 7 N or more and 15 N or less is applied to the optical fiber.

By applying the tension of more than 0 N to the optical fiber, positioning of the optical fiber 12 to be fed can be readily performed, and the optical fiber 12 can be set at a desired position in the twist groove 21 of the PC steel strand 11. Therefore, in the plurality of cross sections of the optical fiber-embedded PC steel strand that are perpendicular to the longitudinal direction of the optical fiber-embedded PC steel strand, it is possible to suppress variation in position of the optical fiber disposed in the twist groove. Accordingly, when the strain distribution of the obtained optical fiber-embedded PC steel strand is measured along the longitudinal direction thereof after the tension has been uniformly introduced thereto, it is possible to suppress the range of variation in the measured value of strain in accordance with the positions along the longitudinal direction thereof. That is, use of the thus-produced optical fiber-embedded PC steel strand enables accurate measurement of strain.

When the tension to be applied to the optical fiber 12 is 20 N or less, it is possible to prevent damage to the optical fiber 12.

No particular limitation is imposed on the method of applying the tension to the optical fiber 12. Examples thereof include a method of pulling a reel 71 configured to feed the optical fiber 12 along an arrow B2 in FIG. 7, i.e., in a direction opposite to the arrow B1 in which the PC steel strand 11 is transferred. By adjusting a force to pull the reel 71, it is possible to adjust the magnitude of the tension to be applied to the optical fiber 12.

Also, an end of the optical fiber 12 is fixed in the twist groove 21 of the PC steel strand 11 before the start of the disposing step, and during the disposing step, the optical fiber 12 can be pulled together with the PC steel strand 11 along the arrow B1 in FIG. 7 from left to right in the drawing. Therefore, further examples of the method of applying the tension to the optical fiber 12 include a method of adjusting a force to pull the PC steel strand 11 and the optical fiber 12.

Until the fixing of the optical fiber 12 with the resin in the fixing step after the feeding of the optical fiber 12 from the reel in the disposing step, the tension of more than 0 N and 20 N or less is preferably applied to the optical fiber 12.

Note that, it is preferable to adjust the twist groove 21 to be always positioned at a place where the optical fiber 12 is fed from the reel 71, by rotating the PC steel strand 11 about the center axis A while pulling the PC steel strand 11 along the arrow B1.

When the optical fiber-embedded PC steel strand includes two or more optical fibers, preferably, a plurality of reels 71 are provided in the same number as the number of the optical fibers, and a plurality of optical fibers are supplied at the same time. In this case, the above-described tension is preferably applied to each of the optical fibers. Then, it is possible to dispose each optical fiber in a predetermined twist groove.

In the disposing step, it is also possible to provide a guiding path, which is configured to guide the optical fiber 12, between the PC steel strand 11 and the reel 71 above a transfer path of the optical fiber 12 so that the optical fiber 12 fed from the reel 71 can be especially accurately disposed at a desired position in the twist groove 21. The guiding path may be configured of, for example, a guiding roller, or a guide provided with a groove that passes the optical fiber 12 therethrough.

Also, in the disposing step, after the optical fiber 12 has been disposed in the twist groove 21 of the PC steel strand 11, the optical fiber 12 may be pressed and inserted into a desired position in the twist groove 21 by an insertion roller or the like. At this time, a resin-supplying step as described below may also be performed. In a cross section that passes through a center axis (rotation axis) of the insertion roller, a portion of the insertion roller to contact the optical fiber 12 preferably has a shape that is curved correspondingly to the outer shape of the optical fiber 12. Also, in the above-described cross section, a portion of the insertion roller to contact the twist groove 21 preferably has a shape that corresponds to the twist groove 21.

By pressing and inserting the optical fiber into the twist groove by the above insertion roller or the like, it is possible to especially stabilize the tension to be applied to the optical fiber. This especially increases a positional accuracy of the optical fiber in the twist groove 21.

(2) Fixing Step

In the fixing step, the optical fiber can be fixed in the twist groove with a resin. Specifically, for example, by curing the resin, the optical fiber can be fixed in the twist groove.

No particular limitation is imposed on the method of curing the resin, which may be selected in accordance with the type of the resin. When the resin is a thermosetting resin, it is possible to cure the resin by heating the resin in the fixing step so as to satisfy curing conditions under which the resin is cured. Also, when the resin is a UV-curable resin, it is possible to cure the resin by irradiating the resin with ultraviolet rays in the fixing step so as to satisfy curing conditions under which the resin is cured.

To do this, the production apparatus 70 for the optical fiber-embedded PC steel strand may include a resin-curing device 73. When the resin is a thermosetting resin, the resin-curing device 73 may be a heating device including a heater or the like. Also, when the resin is a UV-curable resin, the resin-curing device 73 may be an ultraviolet ray irradiating device including a UV lamp configured to irradiate the resin or the like with ultraviolet rays.

(3) Resin-Supplying Step

In the resin-supplying step, the resin is supplied to the twist groove. No particular limitation is imposed on the timing at which the resin-supplying step is performed. For example, after the resin has been previously supplied in the twist groove, the optical fiber may be disposed in the twist groove. That is, the resin-supplying step, the disposing step, and the fixing step may be performed in order.

Also, after the optical fiber has been disposed in the twist groove, the resin may be supplied to the twist groove. That is, the resin-supplying step may be performed after the disposing step and before performing the fixing step, and the disposing step, the resin-supplying step, and the fixing step may be performed in order. By performing the resin-supplying step, which supplies the resin to the twist groove, after the disposing step and before performing the fixing step, it is possible to supply the resin over a wide range of the outer surface of the optical fiber. Therefore, the optical fiber can be firmly fixed to the PC steel strand and can especially accurately conform to stretching of the PC steel strand. As a result, the strain occurring in the PC steel strand is especially accurately reflected to the optical fiber, and the strain of the PC steel strand can be measured using the optical fiber with especially high accuracy.

In order to perform the resin-supplying step, the production apparatus 70 for the optical fiber-embedded PC steel strand may include a resin-supplying device 72. No particular limitation is imposed on the configuration of the resin-supplying device 72. However, for example, it is possible to use a pneumatic resin-supplying device configured to extrude and supply a resin from a nozzle by the action of air, a volumetric resin-supplying device configured to supply a resin by transferring the resin to a nozzle with a screw while metering the resin, or the like.

No particular limitation is imposed on the amount of the resin supplied. However, with respect to the single twist groove, the amount of the resin supplied is preferably 15 g/m or less and more preferably 10 g/m or less per unit length of the twist groove. This is because when the amount of the resin supplied is 15 g/m or less, running and the like of the resin can be prevented.

No particular limitation is imposed on the lower limit of the amount of the resin supplied. However, with respect to the single twist groove, the amount of the resin supplied is preferably more than 1 g/m and more preferably 2 g/m or more per unit length of the twist groove. When the resin is supplied in an amount of more than 1 g/m, the optical fiber can be fixed in the twist groove with sufficient strength.

In the resin-supplying step, the resin can be supplied to at least the twist groove 21 in which the optical fiber 12 is disposed. However, the resin may also be supplied to the twist groove 21 in which the optical fiber is not disposed. Also, for example, the resin may be supplied to not only the twist groove 21 but also the entire surface of the PC steel strand 11. In this case, for example, the resin-supplying device 72 can be configured so that the PC steel strand passes through a resin tank in which the resin is reserved.

The resin-supplying device 72 may also include a resin-removing device so as to be able to remove the excessively supplied resin, for example, when the resin is excessively supplied. The resin-removing device can be a device with a spatula, a die, or the like so as to be able to remove the excessive resin attached to the surface of the PC steel strand 11.

No particular limitation is imposed on the resin supplied in the resin-supplying step. For example, as described in "(1-3) Resin" of the optical fiber-embedded PC steel strand, the resin for use is preferably a resin that is curable in a short time so as to prevent displacement of the position of the optical fiber 12 after disposition of the optical fiber 12 at a desired position in the twist groove 21 of the PC steel strand 11.

Therefore, the curing time of the resin 13 supplied in the resin-supplying step is preferably one minute or shorter and more preferably 50 seconds or shorter.

Use, as the resin 13, of the resin having a curing time of one minute or shorter can shorten the time required until the fixing with the resin after the optical fiber 12 has been disposed at a desired position in the twist groove 21. Therefore, it is possible to prevent displacement of the position of the optical fiber 12 which would otherwise occur before the resin 13 is cured. As a result, in the plurality of cross sections of the optical fiber-embedded PC steel strand that are perpendicular to the longitudinal direction of the optical fiber-embedded PC steel strand, it is possible to set the optical fiber 12 at a desired position in the twist groove 21 with high accuracy, e.g., it is possible to set the optical fiber 12 with high accuracy at a position in the twist groove at which the optical fiber 12 is initially disposed. Accordingly, when a strain distribution of the obtained optical fiber-embedded PC steel strand is measured along the longitudinal direction thereof after a tension has been uniformly introduced thereto, it is possible to especially suppress the range of variation in the measured value of strain in accordance with positions along the longitudinal direction thereof. That is, it is possible to measure the strain with especially high accuracy.

No particular limitation is imposed on the lower limit of the curing time of the resin 13. However, the curing time is preferably 0.1 seconds or longer and more preferably 0.3 seconds or longer. When the curing time thereof is 0.1 seconds or longer, for example, it is possible to prevent clogging of a nozzle or the like that supplies the resin 13.

No particular limitation is imposed on the resin 13. However, a thermosetting resin, a UV-curable resin, a two-liquid mixing-type resin, or the like can be used.

As the resin 13, the UV-curable resin can be especially preferably used. A reason for this is as follows. Specifically, the UV-curable resin can be cured only by irradiation with ultraviolet rays, and compared to the case of performing heating or the like, it is possible to suppress impacts to members other than the resin 13, such as the optical fiber. Also, compared to the thermosetting resin, the two-liquid mixing-type resin, or the like, the UV-curable resin often has a short curing time. Thus, it is possible to especially prevent displacement of the position of the optical fiber 12 in the twist groove 21 which would otherwise occur before the resin 13 is cured.

When the resin is a UV-curable resin, the resin can be irradiated with ultraviolet rays in the fixing step as described above.

Regarding the resin, the rest thereof has been already described, and thus description thereof is omitted here.

(4) Anticorrosive Coating-Forming Step and Outer Coating-Forming Step

As described above, the optical fiber-embedded PC steel strand of the present embodiment may include the anticorrosive coating. Therefore, the production method for the optical fiber-embedded PC steel strand of the present embodiment may include, if necessary, an anticorrosive coating-forming step and an outer coating-forming step as described below.

In the anticorrosive coating-forming step, for example, it is possible to supply and coat a constituting resin and the like of the anticorrosive coating to the outer surface of the optical fiber-embedded PC steel strand in which the optical fiber is fixed with the resin to the surface of the PC steel strand. In the anticorrosive coating-forming step, if necessary, it is possible to further perform heating and the like, and form the anticorrosive coating on the outer surface of the optical fiber-embedded PC steel strand.

Also, in the outer coating-disposing step, for example, it is possible to form the outer coating 42 by molding, through extrusion molding or the like, a constituting resin of the outer coating 42 to the outer periphery of the anticorrosive coating 41.

The resin and the like that can be suitably used as the anticorrosive coating and the outer coating have been already described, and thus description thereof is omitted here.

EXAMPLES

The present invention will be described below by way of specific examples, but the present invention is not limited to these examples.

(Evaluation Methods)

First, evaluation methods of optical fiber-embedded PC steel strands produced in the following Experimental Examples will be described.

(1) Coefficient of Variation in Distance Between Common Tangent of Two PC Steel Wires Forming Twist Groove, and Center of Optical Fiber The optical fiber-embedded PC steel strands produced in the following Experimental Examples were each measured for the distance between the common tangent 311 of the two PC steel wires 111 that formed the twist groove 21 and were next to each other, and the center 121 of the optical fiber 12 in 10 measurement cross sections perpendicular to the longitudinal direction thereof (hereinafter also referred to as "measurement cross sections for measurement of the coefficient of variation").

As illustrated in FIG. 3, the common tangent 311 was, in each of the above measurement cross sections, drawn so as to contact the two PC steel wires 111B at two points and so that the two points were positioned on an external exposed surface of the PC steel strand 11.

In the optical fiber-embedded PC steel strands produced in each of the Experimental Examples, some of the produced optical fiber-embedded PC steel strands were subjected to the present test and the others were subjected to the following measurement of a strain distribution.

Note that, the above measurement cross sections were selected so that the distance between the measurement cross sections next to each other would be 50 cm.

The coefficient of variation was calculated from the values measured in the 10 cross sections.

In the following Experimental Examples, the optical fiber-embedded PC steel strands each including two optical fibers were produced. Therefore, for each of the optical fibers, the coefficient of variation in distance between the above-described common tangent and the center of the optical fiber was determined.

In the following Experimental Examples, the two optical fibers were fixed in the twist grooves of the PC steel strand under the same conditions. Therefore, the coefficients of variation became approximately the same value in the optical fiber-embedded PC steel strand of the same Experimental Example. Therefore, Table 1 presents measurement results of the optical fiber having the greatest coefficient of variation of the coefficients of variation of the two optical fibers that were measured in each Experimental Example.

(2) Measurement of Strain Distribution

The optical fiber-embedded PC steel strand produced in each of the following Experimental Examples was pulled. The optical fiber-embedded PC steel strand to which a tension had been introduced was measured for a strain distribution. When the strain distribution was measured, a tension 0.7 times the lower limit of the maximum testing force described in JIS G 3536 (2014) was introduced to the optical fiber-embedded PC steel strand.

The measurement of the strain was performed according to the following procedure.

As illustrated in FIG. 6, the scattering light measurement device 60 was connected to the optical fiber included in the optical fiber-embedded PC steel strand produced in the following Experimental Examples, and the strain distribution was measured through BOTDR using Brillouin scattering light (strain measurement step).

Then, in the strain distribution, a variation range percentage, i.e., a percentage of a range of variation that is the difference between the maximum value and the minimum value, relative to the maximum value, was calculated by the following formula (2).

$$\text{(Variation range percentage (\%))} = [\text{(Range of variation)} = \text{(Maximum value)}] \times 100 \qquad (2)$$

The variation range percentage that was 3% or less was evaluated as A, the variation range percentage that was more than 3% and 6% or less was evaluated as B, and the variation range percentage that was more than 6% was evaluated as C. The evaluation result that was A or B means suppression of the range of variation in the measured values of the strain in accordance with the positions along the longitudinal direction of the optical fiber-embedded PC steel strand. Meanwhile, the evaluation result that was C means a wide range of variation in the measured values of the strain in accordance with the positions along the longitudinal direction of the optical fiber-embedded PC steel strand. The evaluation results are presented in the row "Variation range percentage of strain" in Table 1.

The variation range percentage of strain was calculated using the result of the strain distribution measured using the optical fiber whose coefficient of variation was presented in Table 1.

Regarding Experimental Examples

In the following, experimental conditions will be described. Experimental Example 1 to Experimental Example 3 are Working Examples, and Experimental Example 4 is a Comparative Example.

Experimental Example 1

Using the same apparatus as the optical fiber-embedded PC steel strand production apparatus as illustrated in FIG. 7 except that two reels feeding the optical fibers were used and two optical fibers were fed from the reels, optical fiber-embedded PC steel strands were produced.

A cross section of the produced optical fiber-embedded PC steel strands perpendicular to the longitudinal direction of the optical fiber-embedded PC steel strands has a structure as illustrated in FIG. 2. The optical fiber-embedded PC steel strands include the PC steel strand 11 in which seven PC steel wires 111 were twisted together. Note that, the outer dimeter of the PC steel strand 11 was 15.2 mm. Then, the optical fibers 12A and 12B were respectively disposed in the twist grooves 21A and 21B each formed between the PC steel wires 111 that were the outer wires of the PC steel strand 11 next to each other. Note that, as the optical fibers 12A and 12B, a single-mode optical fiber having an outer dimeter of 0.9 mm and an elongation at break of 3.5% or more was used.

Also, as illustrated in FIG. 3, the optical fibers 12A and 12B are each disposed in the region 33 enclosed by the straight line 312 and the surfaces 32 of the two PC steel wires 111 that form the twist groove and are next to each other. The straight line 312 is a straight line that is parallel to the common tangent 311 of the two PC steel wires 111 next to each other and in which the distance L312 between the common tangent 311 and the straight line 312 is 0.1 mm.

For evaluation of the position of the optical fiber in the above-described twist groove, the obtained optical fiber-embedded PC steel strand was observed for the positions of the optical fibers 12A and 12B in 10 measurement cross sections for measurement of the coefficient of variation. As a result, the optical fibers 12A and 12B were disposed in the respective regions 33 in all of the measurement cross sections for measurement of the coefficient of variation. In the following Experimental Example 2 and Experimental Example 3, when the positions of the optical fibers 12A and 12B were observed in 10 measurement cross sections for measurement of the coefficient of variation, the optical fibers 12A and 12B were disposed in the respective regions 33 in all of the measurement cross sections for measurement of the coefficient of variation.

The above-described optical fiber-embedded PC steel strand was produced according to the following procedure.

(Disposing Step)

As illustrated in FIG. 7, by pulling the right-hand end in FIG. 7 of the PC steel strand 11 in which seven PC steel wires were twisted together, the PC steel strand 11 was transferred along the arrow B1 from left to right in the drawing.

At this time, the optical fiber 12 to be fed from the reel 71 was previously fixed to the twist groove 21 at the right-hand end in FIG. 7 of the PC steel strand 11, and was pulled and transferred together with the PC steel strand along the arrow B1. By adjusting the force to pull the PC steel strand 11 and the force to pull the reel 71 along the arrow B2 in FIG. 7, the tension to be applied to each of the optical fibers 12 was adjusted to 3 N. The above tension is applied to each optical fiber 12 until the optical fiber 12 is fixed with the resin in the fixing step after the feeding from the reel in the disposing step.

Then, as described above, by positioning the optical fiber 12 at a desired position in the twist groove 21 of the PC steel strand 11 while transferring the PC steel strand 11 and the optical fiber 12, the optical fiber was disposed in the twist groove of the PC steel strand.

(Resin-Supplying Step)

A resin was supplied to the twist groove 21 of the PC steel strand, and the optical fiber 12.

As the resin, a UV-curable resin having a tensile strength of 200 MPa and an elongation at break of 3.5% or more was used. Note that, the UV-curable resin used was cured for 0.5 seconds by irradiation with ultraviolet rays using a UV lamp. That is, the resin used had a curing time of 0.5 seconds.

The resin was supplied using the pneumatic resin-supplying device 72.

At this time, with respect to the single twist groove, the resin was supplied so that the coating amount would be 5 g/m per unit length of the twist groove.

(Fixing Step)

The resin supplied in the resin-supplying step was irradiated with ultraviolet rays by the resin-curing device 73 including a UV lamp, followed by solidifying, thereby fixing the optical fiber in the twist groove of the PC steel strand.

Upon confirming a cross section of the optical fiber-embedded PC steel strand, which was obtained through the above steps, perpendicular to the longitudinal direction of the PC steel strand, as illustrated in FIG. 2, the entire outer surface of the optical fiber 12 could be confirmed to be coated with the resin.

The evaluation results of the obtained optical fiber-embedded PC steel strand are presented in Table 1. Note that, the optical fiber-embedded PC steel strand obtained in Experimental Example 1, a standard deviation determined for calculating the coefficient of variation presented in Table 1 was 0.095 cm.

Experimental Examples 2 and 3

Optical fiber-embedded PC steel strands were produced and evaluated under the same conditions as in Experimental Example 1 except that in the disposing step, the tension to be applied to each optical fiber was changed to 10 N (Experimental Example 2) or 20 N (Experimental Example 3).

Upon confirming a cross section of the optical fiber-embedded PC steel strand, which was obtained in Experimental Example 2 or Experimental Example 3, perpendicular to the longitudinal direction of the PC steel strand, the entire outer surface of the optical fiber 12 could be confirmed to be coated with the resin.

The evaluation results of the obtained optical fiber-embedded PC steel strand are presented in Table 1.

Experimental Example 4

An optical fiber-embedded PC steel strand was produced and evaluated under the same conditions as in Experimental Example 1 except that in the disposing step, no tension was applied to the optical fiber. That is, the tension applied to each optical fiber was 0 N.

The obtained optical fiber-embedded PC steel strand was observed for the positions of the optical fibers 12A and 12B in 10 measurement cross sections for measurement of the coefficient of variation. As a result, the optical fibers 12A and 12B were disposed outward of the respective regions 33 in six of the measurement cross sections for measurement of the coefficient of variation.

The evaluation results of the obtained optical fiber-embedded PC steel strand are presented in Table 1.

TABLE 1

|  | Experimental Example 1 | Experimental Example 2 | Experimental Example 3 | Experimental Example 4 |
|---|---|---|---|---|
| Tension of optical fiber (N) | 3 | 10 | 20 | 0 |
| Coefficient of variation | 0.47 | 0.31 | 0.12 | 0.52 |
| Variation range percentage of strain | B | A | A | C |

From the results presented in Table 1, it could be confirmed that the optical fiber-embedded PC steel strands of Experimental Example 1 to Experimental Example 3, which were produced by applying the tension of more than 0 N and 20 N or less in the disposing step, were able to be suppressed in the coefficient of variation compared to the optical fiber-embedded PC steel strand of Experimental Example 4. That is, it could be confirmed that the optical fiber-embedded PC steel strands of Experimental Example 1 to Experimental Example 3 were suppressed compared to the optical fiber-embedded PC steel strand of Experimental Example 4 in terms of the variation in position of the optical fiber disposed in the twist groove in the cross sections perpendicular to the longitudinal direction thereof.

When the strain distribution of the optical fiber-embedded PC steel strands of Experimental Examples 1 to Experimental Example 3 was measured along the longitudinal direction of the optical fiber-embedded PC steel strands, it could be confirmed that the evaluation of the variation range percentage of strain was A or B. That is, when the strain distribution of the optical fiber-embedded PC steel strands of Experimental Examples 1 to Experimental Example 3 was measured along the longitudinal direction of the optical fiber-embedded PC steel strands, it could be confirmed that the range of variation in the value of strain in accordance with the positions along the longitudinal direction was able to be suppressed. Therefore, it could be confirmed that use of the optical fiber-embedded PC steel strands of Experimental Example 1 to Experimental Example 3 enables accurate measurement of strain.

REFERENCE SIGNS LIST

10,40,51,52 optical fiber-embedded PC steel strand
11 PC steel strand 11A outer surface
111,111A, 111B PC steel wires
12, 12A, 12B, 511, 512, 521 optical fiber
121 center of optical fiber
L12 distance
13 resin
X X axis (longitudinal direction)
Y axis
Z Z axis
C1 circumscribed circle
A center axis
A1 center
21,21A, 21B twist groove
22 inner gap
311 common tangent
312 straight line
L312 distance
32 surfaces of two PC steel wires next to each other
33 region
41 anticorrosive coating
41A outer surface
42 outer coating
50,60 scattering light measurement device
500,600 strain measurement device
501 optical signal transmission part
502 optical signal reception part
503 analysis part
504 display part
505 calculation part
506 light splitter
507 coupler
508 interface
51A, 52A first end
51B,52B second end
511A, 512A, 521A first end
511B, 512B, 521B second end
70 production apparatus for optical fiber-embedded PC steel strand
71 reel
72 resin-supplying device
73 resin-curing device
B1 arrow
B2 arrow

The invention claimed is:

1. An optical fiber-embedded PC steel strand, comprising:
a PC steel strand in which a plurality of PC steel wires are twisted together; and
an optical fiber, wherein
the optical fiber is fixed with a resin in a twist groove that is a groove between two PC steel wires of the PC steel wires, the two PC steel wires being disposed at an outer surface of the PC steel strand and being next to each other, and
a coefficient of variation in distance between
a common tangent of the two PC steel wires that form the twist groove and are next to each other, and
a center of the optical fiber
is 0.5 or less, as measured in 10 cross sections of the PC steel strand that are perpendicular to a longitudinal direction of the PC steel strand.

2. The optical fiber-embedded PC steel strand according to claim 1, wherein in the cross section of the PC steel strand perpendicular to the longitudinal direction of the PC steel strand, the optical fiber is positioned in a region enclosed by
a straight line that is parallel to the common tangent and 0.1 mm apart from the common tangent inward of the PC steel strand, and
surfaces of the two PC steel wires that form the twist groove and are next to each other.

3. The optical fiber-embedded PC steel strand according to claim 1, wherein in the cross section of the PC steel strand perpendicular to the longitudinal direction of the PC steel strand, an outer surface of the optical fiber is coated with the resin.

4. The optical fiber-embedded PC steel strand according to claim 1, wherein the optical fiber-embedded PC steel strand includes two or more optical fibers.

5. The optical fiber-embedded PC steel strand according to claim 1, wherein an elongation at break of the resin is 3.5% or more.

6. The optical fiber-embedded PC steel strand according to claim 1, wherein the optical fiber-embedded PC steel strand includes an anticorrosive coating that coats the outer surface of the PC steel strand.

7. A strain measurement device, comprising:
the optical fiber-embedded PC steel strand according to claim 1; and
a scattering light measurement device connected to the optical fiber-embedded PC steel strand.

8. The strain measurement device according to claim 7, wherein the scattering light measurement device includes an interface configured to output measurement data.

* * * * *